(12) United States Patent
Ito et al.

(10) Patent No.: US 8,992,658 B2
(45) Date of Patent: Mar. 31, 2015

(54) SINTERED METALLIC BEARING AND FLUID DYNAMIC BEARING DEVICE EQUIPPED WITH THE BEARING

(75) Inventors: Fuyuki Ito, Kuwana (JP); Kazuo Okamura, Kuwana (JP); Kenji Hibi, Kuwana (JP)

(73) Assignee: NTN Corporation, Osaka-shi (JP)

( * ) Notice: Subject to any disclaimer, the term of this patent is extended or adjusted under 35 U.S.C. 154(b) by 852 days.

(21) Appl. No.: 13/255,058

(22) PCT Filed: Mar. 2, 2010

(86) PCT No.: PCT/JP2010/053320
§ 371 (c)(1),
(2), (4) Date: Sep. 6, 2011

(87) PCT Pub. No.: WO2010/106909
PCT Pub. Date: Sep. 23, 2010

(65) Prior Publication Data
US 2011/0317949 A1 Dec. 29, 2011

(30) Foreign Application Priority Data

| Mar. 19, 2009 | (JP) | 2009-068186 |
| Aug. 4, 2009 | (JP) | 2009-181575 |
| Aug. 27, 2009 | (JP) | 2009-196798 |

(51) Int. Cl.
*C22C 9/00* (2006.01)
*C22C 38/16* (2006.01)
(Continued)

(52) U.S. Cl.
CPC .............. *C22C 9/00* (2013.01); *F16C 33/104* (2013.01); *F16C 33/128* (2013.01); *F16C 33/145* (2013.01); *B22F 1/007* (2013.01); *B22F 5/00* (2013.01); *C22C 1/0425* (2013.01);
(Continued)

(58) Field of Classification Search
CPC ............................. C22C 47/14; C22C 2001/08
USPC ............ 75/228–250, 255, 252, 253, 254, 950
See application file for complete search history.

(56) References Cited

U.S. PATENT DOCUMENTS 5,918,293 A * 6/1999 Lindberg et al. ................ 75/246
7,014,677 B2 * 3/2006 Takiguchi et al. .............. 75/243
(Continued)

FOREIGN PATENT DOCUMENTS

| EP | 1 985 393 A1 | 10/2008 |
| GB | 2 396 624 A | 6/2004 |

(Continued)

OTHER PUBLICATIONS

Notification of Transmittal of Translation of the International Preliminary Report on Patentability (Form PCT/IB/338) of International Application No. PCT/JP2010/053320 mailed Oct. 27, 2011 with Forms PCT/IB/373 and PCT/ISA/237.
(Continued)

*Primary Examiner* — Scott Kastler
*Assistant Examiner* — Vanessa Luk
(74) *Attorney, Agent, or Firm* — Westerman, Hattori, Daniels & Adrian, LLP

(57) ABSTRACT

A sintered metal bearing is obtained by compression-molding of a raw-material powder containing at least a Cu powder, an SUS powder, and a pure Fe powder and thereafter sintering a compression-molded body at a predetermined temperature.

11 Claims, 19 Drawing Sheets

(51) Int. Cl.
    *B22F 3/12*     (2006.01)
    *F16C 33/10*     (2006.01)
    *F16C 33/12*     (2006.01)
    *F16C 33/14*     (2006.01)
    *B22F 1/00*     (2006.01)
    *B22F 5/00*     (2006.01)
    *C22C 1/04*     (2006.01)
    *C22C 33/02*     (2006.01)
    *F16C 17/10*     (2006.01)

(52) U.S. Cl.
    CPC ............ C22C33/0278 (2013.01); *F16C 17/107* (2013.01); *F16C 2202/10* (2013.01); *F16C 2202/52* (2013.01); *F16C 2204/10* (2013.01); *F16C 2204/60* (2013.01); *B22F 1/0003* (2013.01)
    USPC .................................. 75/247; 75/230; 75/246

(56) References Cited

U.S. PATENT DOCUMENTS

| | | |
|---|---|---|
| 2002/0009242 A1 | 1/2002 | Okamura et al. |
| 2002/0009243 A1 | 1/2002 | Okamura et al. |
| 2002/0048418 A1 | 4/2002 | Okamura et al. |
| 2003/0169952 A1 | 9/2003 | Yamashita et al. |
| 2004/0182200 A1 | 9/2004 | Takiguchi et al. |
| 2005/0044714 A1 | 3/2005 | Yamashita et al. |
| 2009/0041608 A1 | 2/2009 | Ozaki et al. |
| 2009/0142010 A1* | 6/2009 | Ito et al. ......................... 384/279 |

FOREIGN PATENT DOCUMENTS

| | | | |
|---|---|---|---|
| JP | 07-242903 A | 9/1995 | |
| JP | 08-041607 A | 2/1996 | |
| JP | 11-182551 A | 7/1999 | |
| JP | 2001-123253 A | 5/2001 | |
| JP | 2002-178089 A | 6/2002 | |
| JP | 2002-206534 A | 7/2002 | |
| JP | 2003-239951 A | 8/2003 | |
| JP | 2004-204298 A | 7/2004 | |
| JP | 2006-016680 A | 1/2006 | |
| JP | 2006-189081 A | 7/2006 | |
| JP | 2006-214003 A | 8/2006 | |
| JP | 2008-069384 A | 3/2008 | |
| JP | 2008-169460 A | 7/2008 | |
| WO | WO2006073090 | * 7/2006 | ................ B22F 5/00 |

OTHER PUBLICATIONS

International Search Report of PCT/JP2010/053320, date of mailing May 25, 2010.

* cited by examiner

US 8,992,658 B2

SINTERED METALLIC BEARING AND FLUID DYNAMIC BEARING DEVICE EQUIPPED WITH THE BEARING

TECHNICAL FIELD

The present invention relates to a sintered metal bearing obtained by sintering of a metal powder that has undergone compression molding, and to a fluid dynamic bearing device provided with the bearing.

BACKGROUND ART

A sintered metal bearing is used suitably as an oil-impregnated sintered bearing obtained, for example, through impregnation of a lubricating oil and the like into inner pores; specifically, used at parts required to have excellent bearing performance and durability, such as bearing components for automobiles and a motor spindle for information apparatuses.

Here, the sintered metal bearing is used, for example, in a fluid dynamic bearing device. The fluid dynamic bearing device is a bearing device which rotationally supports a shaft member in a non-contact manner with use of a dynamic pressure action, which is generated in a bearing gap, of a lubricating oil or the like. The bearing device has characteristics such as high-speed rotation operation, high-speed rotational accuracy, and quietness. In recent years, by taking advantage of those characteristics, the bearing device has been suitably used as a bearing device for a motor to be mounted to various electrical apparatuses such as information apparatuses. Specifically, as a bearing device for a motor, the bearing device has been suitably used in the following: a spindle motor for a magnetic disk drive such as an HDD, an optical disk drive for a CD-ROM, a CD-R/RW, a DVD-ROM/RAM, or the like, or a magneto-optical disk drive for an MD, an MO, and the like; a polygon scanner motor for a laser beam printer (LBP); or a fan motor.

The above-mentioned various motors are required to have higher high-speed rotational accuracy. Bearings for supporting a spindle for the motors are one of factors which determine the required performance. In recent years, there has been studied a use of fluid bearings which have such an excellent property as to meet the required performance, or the fluid bearings have been actually used.

Fluid bearings of this type are roughly classified into dynamic pressure bearings provided with a dynamic pressure generating portion for generating dynamic pressure in a lubricating fluid in a bearing gap, and so-called perfectly cylindrical bearings (bearings whose sectional configuration is perfectly circular) provided with no such dynamic pressure generating portion.

For example, in a fluid dynamic bearing device incorporated in a spindle motor for a disk drive device, such as an HDD, both the radial bearing portion supporting the shaft member in the radial direction and the thrust bearing portion supporting the shaft member in the thrust direction may be formed by dynamic pressure bearings. As the radial bearing portion in the fluid dynamic bearing device of this type (dynamic bearing device), there has been conventionally well-known one which forms the following: as dynamic pressure generating portions, regions, in which a plurality of dynamic pressure generating grooves are arranged, for example, on a radially inner surface of a sleeve formed of a sintered metal; and radial bearing gaps between the radially inner surface on which the dynamic pressure generating portions are formed and a radially outer surface of the shaft member, the radially outer surface facing the radially inner surface (for example, refer to Patent Literature 1 below).

As described above, the sintered metal bearing for many uses is formed, for example, as disclosed in Patent Literature 2 below, through impregnation of a fluid such as a lubricating oil or a lubricating grease into a porous body obtained by sintering of a Cu powder, an Fe powder, or a metal powder containing both of those powders as main components, the powders having been compression-molded into a predetermined shape (cylindrical shape in many cases).

Here, Patent Literature 3 below discloses an oil-impregnated sintered bearing obtained by compression-molding and sintering subsequent thereto of a mixed metal powder containing a Cu powder and an SUS powder.

Alternatively, Patent Literature 4 below discloses an example of a sintered metal bearing containing an Fe-based powder as a main component. Specifically, there has been proposed an Fe-based sintered sliding member formed of a Cu-based alloy powder, a Cu powder, a carbon powder, and an Fe power. The Fe-based sintered sliding member contains the powders at the following weight ratios: a Cu component of 15 to 25 wt %; an Si component of 1 to 5 wt %; an Sn component of 1 to 5 wt %; a carbon component of 3 to 10 wt %; and a balance Fe component (55 to 80 wt %). Further, Patent Literature 4 discloses that the sintered sliding member is manufactured by powder-press molding of a mixed powder obtained through such formulation as to achieve the above-mentioned weight ratios, and then by sintering at 1,100 to 1,150° C. of a powder-press body thus obtained.

Further, a bearing sleeve formed of a sintered metal (sintered metal bearing), which is used by being incorporated in the above-mentioned fluid dynamic bearing device, is similarly formed by sizing of a sintered raw material, that is, a sintered compression-molded body obtained by compression-molding of a metal powder containing a Cu powder, an Fe powder, or both of those powders into a predetermined shape with use of a die (for example, refer to Patent Literatures 5 and 6 below).

FIGS. 29 to 31 illustrate a schematic structure of a sizing apparatus as an example. This apparatus includes, as main components, a cylindrical die 313 into which a radially outer surface 311*b* of a sintered raw material 311 is press-fitted, a sizing pin 312 for molding a radially inner surface 311*a* of the sintered raw material 311, and an upper punch 314 and a lower punch 315 for pressing both end surfaces of the sintered raw material 311 from an upper-and-lower direction. On an outer peripheral surface of the sizing pin 312, there are provided a projection-recess molding die in conformity with a shape of a bearing surface of a finished product. Projecting portions of the molding die form regions of dynamic pressure generating grooves in a bearing surface, and recessed portions forms regions other than the dynamic pressure generating grooves.

In sizing, first, as illustrated in FIG. 29, the sintered raw material 311 is arranged in such a manner as to be positioned to an upper surface of the die 313. In this case, a predetermined press-fitting margin D301 is secured between the radially outer surface 311*b* of the sintered raw material 311 and a radially inner surface of the die 313 into which the sintered raw material 311 is to be press-fitted, and a radially inner gap D302 exists between the radially inner surface 311*a* of the sintered raw material 311 and the molding die (projecting portions) of the sizing pin 312 under a state prior to press-fitting into the die 313.

After that, the upper punch 314 and the sizing pin 312 are lowered so that the sintered raw material 311 is press-fitted into the die 313. As illustrated in FIG. 30, the upper punch 314 is pressed-in up to a bottom dead center, and the sintered raw material 311 is pressed onto an upper surface of the lower punch 315 so as to be pressurized from the upper-and-lower direction. The sintered raw material 311 deforms by receiving a compressive force from the die 313, the upper punch 314, and the lower punch 315, and the radially inner surface 311a is pressurized in conformity with the molding die of the sizing pin 312. A pressurizing amount of the radially inner surface 311a is substantially equal to a difference between the press-fitting margin D301 and the radially inner gap D302. A surface layer part corresponding to a predetermined depth from the radially inner surface 311a is pressurized in conformity with the molding die of the sizing pin 312, and is plastically fluidized so as to adhere to the molding die. With this, the shapes of the molding die are transferred to the radially inner surface 311a of the sintered raw material 311, and the bearing surface is molded (simultaneously, the radially outer surface 311b of the sintered raw material 311 undergoes sizing). In this case, until the upper punch 314 reaches the bottom dead center so as to compress the sintered raw material 311 after the upper punch 314 is inserted into the die 313, the lower punch 315 stands by in the die 313 and maintains its position.

After that, as illustrated in FIG. 31, the sizing pin 312, the upper punch 314, and the lower punch 315 are raised so as to pull out the sintered raw material 311 from the die 313, with a positional relation between the molding die and the sintered raw material 311 being maintained. When the sintered raw material 311 is pulled out from the die 313, springback occurs in the sintered raw material 311, and an inner diameter dimension increases. With this, the sintered raw material can be pulled out from the sizing pin without damage to the shapes of the dynamic pressure generating portions.

CITATION LIST

Patent Literature

PTL 1: JP 2003-239951 A
PTL 2: JP 11-182551 A
PTL 3: JP 2006-214003 A
PTL 4: JP 2001-123253 A
PTL 5: JP 2002-178089 A
PTL 6: JP 2002-206534 A

SUMMARY OF INVENTION

Technical Problems

By the way, recently, for example, as typified by a capacity increase of an HDD, in various information-apparatus motors, there is a tendency that, for the purpose of increasing an information processing amount, a spindle is rotated at higher speed and a weight of the spindle including an information storage medium increases. Thus, the above-mentioned sintered metal bearing used by being incorporated in the information-apparatus motors of this type is required to have abrasion resistance higher than ever before. From such a viewpoint, as disclosed in Patent Literature 3 above, the sintered metal bearing formulated with an SUS powder seems to be effective. However, the SUS powder is poor in sintering property with respect to other metal powders. Thus, only with formulation with the SUS powder, there is a risk that sufficient sintering strength cannot be obtained.

Further, as described above, the above-mentioned sintered metal bearing used by being incorporated in the information-apparatus motors of this type is required to have abrasion resistance higher than ever before. Meanwhile, in order to satisfy a request for cost reduction, with regard to the above-mentioned raw-material powder for the bearing, there has been studied a shift from a relatively expensive Cu powder to a relatively cheap Fe powder.

However, as the rate of the Fe powder becomes higher, there is a risk that the following harmful influences occur. That is, although the Cu component is essential to achieve satisfactory slidability with respect to the shaft, the rate of the Cu component relatively decreases due to an increase of the rate of the Fe component. Thus, it is difficult to secure desired slidability. Further, in order to achieve satisfactory slidability, a sliding surface (bearing surface) with respect to a counterpart is also required to have high surface accuracy. However, when the Fe component accounts for a large proportion of the bearing, excellent processability of the Cu component is not reflected, which may lead to a risk that a predetermined surface accuracy cannot be achieved.

Further, as described in Patent Literature 4 above, normally, a sintering temperature of the Fe-based sintered metal bearing is set to temperatures relatively approximate to the melting point of Fe as a main component (1,100° C. to 1,150° C.). Thus, sintering is performed at a temperature exceeding the melting point of Cu. With this sintering, the Cu powder is molten and enters the inner pores, and hence it is difficult to form the bearing surface equivalently to the Fe component. Thus, in this case, slidability and processability of the Cu component are less liable to be reflected.

Further, in consideration of molding accuracy achieved by the above-mentioned sizing of the sintered raw material (sintered metal bearing), as illustrated in FIG. 32, there is a risk of occurrence of a difference in inner diameter dimension between both axial end portions 311c and 311d of the sintered raw material 311 molded by the method described above. This difference is caused, for example, by the following influences: a compression amount of the one end portion 311c of the sintered raw material 311 is larger than a compression amount of the another end portion 311d; and density at the one end portion 311c of the sintered raw material 311 is higher than density of the another end portion 311d. In other words, a difference in density occurring between the one end portion 311c and the another end portion 311d of the sintered raw material 311 has, for example, an influence on a magnitude of a springback amount, which constitutes such a factor as to cause the difference in inner diameter dimension between both the axial end portions 311c and 311d of the sintered raw material.

In this manner, an inner diameter dimension d31 of the one end portion 311c of the sintered raw material 311 decreases, and an inner diameter dimension d32 of the another end portion 311d increases. With this, the radially inner surface 311a of the sintered raw material 311 exhibits such a tapered shape as to radially increase from an upper-punch-314 side to a lower-punch-315 side, which leads to poor rotational accuracy.

In view of the above-mentioned circumstances, it is a first technical object in this specification to provide a sintered metal bearing excellent in abrasion resistance and capable of exhibiting high sintering strength.

Further, in view of the above-mentioned circumstances, it is a second technical object in this specification to provide a sintered metal bearing which can be manufactured at low cost and is capable of exerting high abrasion resistance and slidability.

Still further, in view of the above-mentioned circumstances, it is a third technical object in this specification to provide a fluid dynamic bearing device and a manufacturing method for a bearing sleeve, which contribute to enhancement of rotational accuracy through reduction of difference in inner diameter dimension between both axial end portions of a sintered raw material.

Solution to Problems

The above-mentioned first technical object is achieved with a sintered metal bearing according to a first invention of the present application. That is, this sintered metal bearing is a sintered metal bearing, which is obtained by compression-molding and sintering subsequent thereto of a raw-material powder containing a plurality of metal powders, and which includes therein a large number of pores capable of impregnating oil, in which the raw-material powder contains a Cu powder, an SUS powder, and a pure Fe powder. Note that, the "pure Fe powder" in this case represents a high-purity iron powder used in industrial fields, an example of which has a purity of 99% or more.

In this manner, when the pure Fe powder is further formulated with respect to the Cu powder and the SUS powder which are excellent in sliding property and processability, excellent abrasion resistance of the SUS powder can be achieved in a product that has undergone sintering. In addition, the pure Fe powder compensates for insufficient sintering property of the SUS powder and other powders. As a result, the sintered metal bearing having high sintering strength can be obtained. In particular, in the bearing of this type, it is necessary to leave a large number of pores for oil impregnation, and hence density at the time of compression molding cannot be set to be sufficiently high. Under this circumstance, through formulation of the pure Fe powder having a sintering property and a compression property which are higher than those of the SUS powder, desired sintering strength (for example, indicated by radial-crushing strength) can be obtained while securing a considerable number of inner pores.

In this case, in order to sufficiently obtain the above-mentioned effect, at least any one of the above-mentioned Cu power, SUS powder, and pure Fe powder may be contained at the highest rate in the raw-material powder. Further, in that case, those three metal powders may be contained at three highest rates of those of the powders contained in the raw-material powder. Specifically, respective containing rates of the Cu powder, the SUS powder, and the pure Fe powder with respect to the raw-material powder may be adjusted as follows: the Cu powder: 15 wt % or more and 60 wt % or less; the SUS powder: 10 wt % or more and 35 wt % or less; and the pure Fe powder: 20 wt % or more and 60 wt % or less.

Further, the raw-material powder may further include an Fe-phosphide powder. Normally, Fe phosphide is more brittle than pure Fe, and it is considered that a use thereof should be avoided. However, when the Fe-phosphide is formulated in a powder shape separately from the pure Fe powder in the raw-material powder, strength or rigidity of the sintered body is not adversely affected. In contrast, abrasion resistance of a bearing surface can be enhanced.

Further, in this case, respective containing rates of the Cu powder, the SUS powder, the pure Fe powder, and the Fe-phosphide powder with respect to the raw-material powder may be adjusted as follows: the Cu powder: 15 wt % or more and 60 wt % or less; the SUS powder: 10 wt % or more and 30 wt % or less; the pure Fe powder: 20 wt % or more and 60 wt % or less; and the Fe-phosphide powder: 0.1 wt % or more and 2.0 wt % or less. In this context, the reason why the formulation rate (containing rate) of the Fe-phosphide powder is set as described above is as follows. That is, the above-mentioned enhancement effect of abrasion resistance cannot be sufficiently obtained when the containing rate of the Fe-phosphide powder is less than 0.1 wt %, and there arises a risk that the strength of the sintered body is adversely affected when the containing rate of the Fe-phosphide powder is more than 2.0 wt %.

The raw-material powder may further include a low-melting-point-metal powder. The "low-melting-point-metal" here represents a metal having a melting point to such an extent as to be molten at the time of sintering. Such metal powder is molten and liquid-phased at the time of sintering so as to act as a binder for powders of the same type or of different types among the Cu powder, the SUS powder, and the pure Fe powder. Thus, a binding force between the powders can be reinforced so as to enhance the sintering strength. As the low-melting-point-metal powder, it is possible to use metal powders which are surely molten at, for example, the sintering temperature of the Cu powder, that is, powders of metals such as Sn, Zn, Al, and P, or an alloy powder containing two or more of those metals. Of those, in consideration of hardness after sintering, the Sn powder is suitable.

Further, as described above, when the low-melting-point-metal powder is formulated, the rate of the Cu powder which mainly contributes to the sintering action may be reduced. Thus, for example, the containing rate of the Cu powder with respect to the raw-material powder can be set to be smaller than a total sum of the containing rates of the SUS powder and the pure Fe powder. Specifically, respective containing rates of the Cu powder, the SUS powder, the pure Fe powder, and the low-melting-point-metal powder with respect to the raw-material powder may be adjusted as follows: the Cu powder: 15 wt % or more and 45 wt % or less; the SUS powder: 10 wt % or more and 30 wt % or less; the pure Fe powder: 20 wt % or more and 60 wt % or less; and the low-melting-point-metal powder: 0.5 wt % or more and 10 wt % or less.

Alternatively, when the Fe-phosphide powder is further contained, the respective containing rates of the above-mentioned metal powders with respect to the raw-material powder may be adjusted as follows: the Cu powder: 15 wt % or more and 45 wt % or less; the SUS powder: 10 wt % or more and 30 wt % or less; the pure Fe powder: 20 wt % or more and 60 wt % or less; the Fe-phosphide powder: 0.1 wt % or more and 2.0 wt % or less; and the low-melting-point-metal powder: 0.5 wt % or more and 10 wt % or less.

The raw-material powder may further include graphite. In this case, graphite acts as a solid lubricant, and hence acts so as to enhance slidability with respect to the sliding surface (bearing surface) of the sintered body, or with respect to a die at the time of compression molding or at the time of a secondary process after sintering.

Further, the above-mentioned sintered metal bearing according to the first invention may be obtained by sintering at a temperature lower than a melting point of Cu. In the sintered metal bearing thus obtained, the Cu powder in a compression-molded body remains in a granular shape without being molten. Thus, Cu compositions in a finished product remain as powder (granular) compositions, and partially constitute the bearing surface together with SUS compositions and pure Fe compositions. Thus, satisfactory slidability can be obtained with respect to a counterpart (shaft and the like). Further, processability of the bearing surface can be secured while increasing the rate of the pure Fe component. As a result, surface accuracy of the sliding surface can be maintained. Such structure is further effective in the case where the low-melting-point-metal powder is formulated as described above so as to reinforce the strength of the sintered body, or in a case where the Cu powder is partially replaced with the pure Fe powder so that the containing rate of the pure Fe powder is further enhanced.

Further, the sintered metal bearing according to the first invention may have a sintering density adjusted within a range of 6.8 g/cm³ or more and 7.3 g/cm³ or less. In the bearing in which the sintering density (bulk density) is adjusted within the above-mentioned range, inner pores by the number or of a size to such an extent as to make the bearing usable as an oil-impregnated sintered bearing are secured, with abrasion resistance, strength, slidability, and processability owing to the metal powders being satisfied. In particular, the sintered metal bearing can be suitably supplied as a bearing component for fluid dynamic bearing devices described later.

Further, the sintered metal bearing having the above-mentioned structure may include a dynamic pressure generating portion for generating a dynamic pressure action of a fluid between the dynamic pressure generating portion and a shaft to be rotationally supported. Specifically, the dynamic pressure generating portion may be formed on an inner peripheral surface to serve as a bearing surface or on an end surface in the axial direction. In this case, as described above, when a structure is employed in which the Cu powder, the SUS powder, and the pure Fe powder are formulated with a good balance, for example, projection-recess shapes of the dynamic pressure generating groove and the like can be molded with high accuracy. In addition, slidability or abrasion resistance at projecting portions can be enhanced.

The sintered metal bearing having the above-mentioned structure is excellent in abrasion resistance, strength, and slidability as described above, and hence can be used as a bearing provided in a fluid dynamic bearing device. In particular, the sintered metal bearing can be used suitably to a spindle in which a rotary weight of a shaft to be supported is relatively large, such as a motor spindle for information apparatuses such as an HDD.

Further, the first technical object is achieved also by a manufacturing method for a sintered metal bearing which is obtained by compression-molding and sintering subsequent thereto of a raw-material powder containing a plurality of metal powders, and which includes therein a large number of pores capable of impregnating oil, the manufacturing method including compression-molding and sintering of the raw-material powder containing a Cu powder, an SUS powder, and a pure Fe powder.

Further, in this case, in order to enhance mutual dispersibility, for example, of the pure Fe powder and the Cu powder, the pure Fe powder and the Cu powder maybe supplied to the raw-material powder under such a state as to be integrated with each other by partial alloying. With this, the pure Fe powder and the Cu powder are integrally supplied to the raw-material powder, and hence a situation is prevented in which the pure Fe powder and the Cu powder are segregated. As a result, a homogeneous sintered body can be obtained.

Further, the above-mentioned second technical object is achieved with a sintered metal bearing according to a second invention of the present application. That is, this sintered metal bearing is a sintered metal bearing in which Cu compositions are dispersed in the Fe-based compositions, and in which the Fe-based compositions are contained ten times or more of the Cu compositions by weight ratio, and that the Cu compositions remain as granular compositions. Here, the "Fe-based compositions" include compositions containing only Fe and include a composition containing Fe as a main component, such as SUS. Further, with regard to the Cu compositions, it is not necessary for all the Cu compositions to have granular shapes, and the Cu compositions may partially have non-granular shapes by sintering.

In this manner, when the rate of the Fe compositions is greatly increased with respect to that of the Cu compositions, abrasion resistance is enhanced and a manufacturing cost is reduced. In addition, when the Cu compositions remain as granular compositions, the Cu compositions constitute a surface of a bearing, such as a sliding surface, together with the Fe-based compositions. Thus, satisfactory slidability can be obtained with respect to a counterpart (shaft and the like). Further, processability of the sliding surface can be secured while increasing the rate of the Fe component. As a result, surface accuracy of the sliding surface can be maintained. Further, the above-mentioned setting of the containing rates of the Fe-based compositions and the Cu compositions (ten times) is based on knowledge of the inventors of the present invention that all the three properties of abrasion resistance, slidability, and cost are satisfied by containing of the Fe-based compositions and the Cu compositions at the rates.

Here, specifically, the containing rate of the Fe-based compositions can be set to 90 wt % or more by weight ratio. Further, in this case, the containing rate of the Fe-based compositions can be enhanced up to 98 wt % by weight ratio. In a sintered metal bearing having Fe-based compositions contained at a rate within the above-mentioned range, cost reduction can be achieved while satisfying abrasion resistance and slidability at practical level.

Further, the Fe-based compositions maybe formed of one or both of Fe compositions and SUS compositions. In this case, the Fe compositions are preferred when strength and cost reduction are emphasized, and the SUS compositions are preferred when corrosion resistance is emphasized.

Further, the sintered metal bearing having the above-mentioned structure may include a dynamic pressure generating portion for generating a dynamic pressure action of a fluid between the dynamic pressure generating portion and a shaft to be rotationally supported. Specifically, the dynamic pressure generating portion may be formed on an inner peripheral surface to serve as a bearing surface or on an end surface in the axial direction. The bearing according to the present invention employs a structure in which Cu compositions remain as granular compositions, and hence the Cu compositions exist also in a bearing surface-layer portion including a bearing surface. For example, projection-recess shapes of the dynamic pressure generating grooves can be molded with high accuracy.

As described above, the sintered metal bearing having the structure described hereinabove is excellent in abrasion resistance and slidability, and hence a fluid dynamic bearing device including this bearing can be suitably used.

Further, the above-mentioned object is achieved by a manufacturing method for a sintered metal bearing in which Cu compositions are dispersed in Fe-based compositions, the manufacturing method including compression-molding of a raw-material powder containing at least a Cu powder and an Fe-based powder ten times or more than the Cu powder by weight ratio, and sintering subsequent thereto, at a temperature lower than the melting point of Cu, of a compression-molded body thus obtained.

By this method, the Cu powder in the compression-molded body remains in a granular shape without being completely molten. Similarly to the above-mentioned case, slidability (conformability with a counterpart) or processability can be secured at high level. Further, the Cu powder is prevented from being molten at the time of sintering, and hence new inner pores are prevented from being formed. Further, expansion of inner pores adjacent to each other is prevented. In any case, the inner pores are prevented from increasing, each of which has such a size as to allow a lubricating oil described below to flow.

As the Fe-based powder, the Fe powder or the Fe-based alloy powder such as the SUS powder can be used. Further, in order to enhance mutual dispersibility, for example, of the Fe-based powder and the Cu powder, the Fe-based powder and the Cu powder may be supplied to the raw-material powder under such a state as to be integrated with each other by partial alloying. With this, in principle, both of the Fe-based powder and the Cu powder are integrally supplied to the raw-material powder, and hence a situation is prevented in which the Fe-based powder and the Cu powder are segregated. As a result, a homogeneous sintered body can be obtained.

In addition, the Cu powder used as one component of the above-mentioned raw-material powder may have a grain size finer than that of the Fe-based powder. Here, whether or not "the Cu powder has a grain size finer than that of the Fe-based powder" may be evaluated relative to each other with any of maximum grain sizes, average grain sizes, and grain-size median values of both the powders. Alternatively, a magnitude relation of both the powders may be determined based on a magnitude relation between numerical values indicated with reference to two or more evaluation criteria of those values. As described above, with use of the Cu powder finer than the Fe-based powder, a contact area (contact part) with respect to the Fe-based powder increases in comparison, for example, to a contact area of a Cu powder having a grain diameter equivalent to that of the Fe-based powder. Thus, even when the formulation rate of the Fe powder is greatly increased (even at 90 wt % or more), strength of the bearing can be secured. Further, although there is a risk of deterioration of fluidity as the powder becomes finer, in the present invention, the formulation rate of the Cu powder is suppressed in comparison to the formulation rate of the Fe-based powder. Thus, risks of this type do not arise.

Further, the above-mentioned third technical object is achieved by a manufacturing method for a bearing sleeve according to a third invention of the present application. Specifically, in this manufacturing method, when a cylindrical bearing sleeve to be externally inserted with respect to a shaft member so that an inner peripheral surface thereof forms radial bearing gaps with respect to an outer peripheral surface of the shaft member is manufactured by sizing, with use of a die and a pair of punches, of a sintered raw material formed through a sintering step, in the sizing step, after the sintered raw material is press-fitted into the die with a pressurizing force from one of the punches, another of the punches is moved toward the one of the punches. In this manner, the sintered material is compressed in the axial direction.

According to the above-mentioned manufacturing method for a bearing sleeve according to the third invention, the another of the punches is pushed up under a state in which the sintered raw material is press-fitted into the die over the entire length and compressed with the one of the punches. Thus, under a state in which the one of the punches has reached a bottom dead center, the sintered raw material can be pressurized from both the axial end portions. Thus, also near the another of the punches, the sintered raw material is compressed by a pressing force imparted from an another-punch side to a one-punch side.

The another of the punches can be moved to the one-punch side after the entire of the sintered raw material is press-fitted into the die. Further, until the sintered raw material is press-fitted into the die, the another of the punches can be made to stand by, and the sintered raw material can be press-fitted into the die while being held with the one of the punches and the another of the punches.

An amount of movement of the another of the punches to the one-punch side can be increased in comparison to an axial extending amount of the sintered raw material when the sintered raw material is press-fitted into the die by the one of the punches. With this, the sintered raw material can be compressed so as to be smaller than an axial dimension of the sintered raw material prior to extension in the axial direction. Thus, near the another of the punches, the sintered raw material can be reliably compressed.

The fluid bearing device according to the third invention includes the bearing sleeve according to the above-mentioned third invention, a shaft member inserted along an inner periphery of the bearing sleeve, a radial bearing gap formed between an inner peripheral surface of the bearing sleeve and an outer peripheral surface of the shaft member, and a radial bearing portion for supporting the shaft member in a radial direction with use of a lubricating-fluid film formed in the radial bearing gap.

Advantageous Effects of Invention

As described above, according to the sintered metal bearing of the first invention of the present application and the manufacturing method therefor, a sintered metal bearing excellent in abrasion resistance and capable of exhibiting high sintering strength can be provided.

Further, as described above, according to the sintered metal bearing of the second invention of the present application and the manufacturing method therefor, a sintered metal bearing capable of exerting high abrasion resistance and slidability can be manufactured at low cost.

Still further, as described above, according to the manufacturing method for a bearing sleeve of the third invention of the present application, also near the another of the punches, the sintered raw material is compressed by the pressing force imparted from the another-punch side to the one-punch side. Thus, through reduction of the difference in density between both the axial ends, the difference in inner diameter dimension between both the axial end portions of the sintered raw material can be reduced so that rotational accuracy is enhanced.

BRIEF DESCRIPTION OF DRAWINGS

[FIG. 21 B] A lower end view of the bearing sleeve.

DESCRIPTION OF EMBODIMENTS

Figure 1:
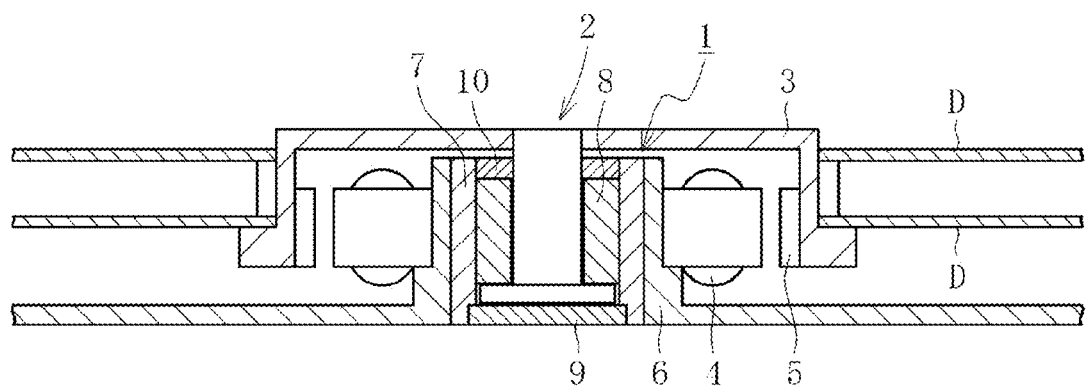
[FIG. 1] A sectional view of a fluid dynamic bearing device incorporating a sintered metal bearing according to an embodiment of a first invention of the present application, and a spindle motor including this fluid dynamic bearing device.

In the following, description is made of embodiments of a sintered metal bearing according to a first invention of the present application with reference to FIGS. 1 to 6.

The sintered metal bearing according to the present invention is formed by compression molding of a Cu powder, an SUS powder, and a pure Fe powder, or of a raw-material powder containing those metal powders as main components, and sintering of the same. Here, formulation rates of respective metal powders are adjusted so that respective containing rates of the Cu powder, the SUS powder, and the pure Fe powder with respect to the raw-material powder as a whole are set as follows: the Cu powder: 15 wt % or more and 60 wt % or less; the SUS powder: 10 wt % or more and 35 wt % or less; and the pure Fe powder: 20 wt % or more and 60 wt % or less.

Of the metal powders contained in the raw-material powder, the Cu powder are not particularly limited in composition or shape. Thus, other than a pure Cu powder, a Cu powder alloyed partially or entirely with another metal may be used. Further, manufacturing methods for the Cu powder are not particularly limited as well, and hence it is possible to use Cu powders manufactured by various methods such as a reduction method, an atomization method, or an electrolytic method. Sizes of the Cu powders are not particularly limited as well. However, for example, when a Cu powder to be used has a grain size finer than that of the SUS powder or the pure Fe powder, a formulation rate of the Cu powder can be reduced. This is because, as the Cu powder becomes finer, a contact area of the Cu powder with respect to the SUS powder and the pure Fe powder increases, with the result that bearing strength can be secured even with a relatively small amount of the Cu powder. Further, this is also because, in comparison to a case where a Cu powder having the same size as that of the SUS powder or the pure Fe powder is used, a rate of Cu compositions exposed, for example, on a bearing surface of a finished product increases, and hence slidability is easily secured even at a low formulation rate of the Cu powder.

Further, types (compositions), shapes, and the like of the SUS powder contained in the raw-material powder are not particularly limited, and SUS powders of any of the following composition types may be used: an austenitic composition; an austenitic-ferritic composition; a ferritic composition; and a martensitic composition. Of those, the martensitic SUS powder can be used as an SUS powder especially excellent in mechanical strength or abrasion resistance. Typical examples of this stainless steel include SUS410 (11.5 Cr to 13.5 Cr).

Types, shapes, and the like of the pure Fe powder are not particularly limited as well. For example, various pure Fe powders such as a reduced Fe powder, an atomized Fe powder, and an electrolytic Fe powder can be used regardless of manufacturing methods therefor.

Further, other powders may be contained in addition to the above-mentioned metal powders, an example of which includes an Fe-phosphide powder ($Fe_3P$ powder). In this case, the Fe-phosphide powder is formulated for the purpose of enhancement of abrasion resistance of a sintered body. With regard to a formulation rate thereof, a lower limit value is set to an extent that such an effect as to enhance the abrasion resistance is confirmed, and an upper limit value is set to an extent that a mechanical property of the sintered body is not adversely affected. Specifically, in a case where the Cu powder, the SUS powder, and the pure Fe powder are contained in the raw-material powder at the above-mentioned rate, the formulation rate of the Fe-phosphide powder is adjusted within a range of 0.1 wt % or more and 2.0 wt % or less with respect to the raw-material powder as a whole.

Alternatively, in addition to the above-mentioned powders, a powder of a metal having a melting point lower than that of Cu, for example, the Sn powder may be contained. That is, the above-mentioned raw-material powder may contain the Cu powder, the SUS powder, the pure Fe powder, the Fe-phosphide powder, and the Sn powder as a low-melting-point-metal powder. The metal powder of this type is molten (liquid-phased) at the time of sintering and acts as a binder for the metal powder of the same type or the metal powders of the different types, which contributes to enhancement of strength of the sintered body (sintered metal bearing). Thus, in such a case, a rate of the Cu powder contributing mainly to a sintering action may be reduced. Specifically, the containing rates of the Cu powder, the SUS powder, the pure Fe powder, the Fe-phosphide powder, and the low-melting-point-metal powder (Sn powder) with respect to the raw-material powder may be adjusted so that the Cu powder accounts for 15 wt % or more and 45 wt % or less, the SUS powder accounts for 10 wt % or more and 30 wt % or less, the pure Fe powder accounts for 20 wt % or more and 60 wt % or less, the Fe-phosphide powder accounts for 0.1 wt % or more and 2.0 wt % or less, and the Sn powder accounts for 0.5 wt % or more and 10 wt % or less, more preferably adjusted so that the Cu powder accounts for 30 wt % or more and 45 wt % or less, the SUS powder accounts for 15 wt % or more and 25 wt % or less, the pure Fe powder accounts for 30 wt % or more and 50 wt % or less, the Fe-phosphide powder accounts for 0.2 wt % or more and 1.0 wt % or less, and the Sn powder accounts for 1.0 wt % or more and 4.0 wt % or less.

Further, for the purpose of improvement of moldability or mold-releasability at the time of compression molding, or slidability of a finished product, a graphite powder may be further contained in the above-mentioned raw-material powder. In this case, the above-mentioned raw material powder may include the Cu powder, the SUS powder, the pure Fe powder, the Fe-phosphide powder, the low-melting-point-metal powder (Sn powder), and the graphite powder. Further, in this case, the containing rates of the respective powders with respect to the raw-material powder may be adjusted so that the Cu powder accounts for 15 wt % or more and 45 wt % or less, the SUS powder accounts for 10 wt % or more and 30 wt % or less, the pure Fe powder accounts for 20 wt % or more and 60 wt % or less, the Fe-phosphide powder accounts for 0.1 wt % or more and 2.0 wt % or less, the Sn powder accounts for 0.5 wt % or more and 10 wt % or less, and the graphite powder accounts for 0.5 wt % or more and 2.5 wt % or less.

The sintered metal bearing having the raw-material powder composition described hereinabove is manufactured, for example, by a method described below. Specifically, the sintered metal bearing is manufactured through at least the following three steps: a step (a) of compression-molding the above-mentioned raw-material powder into a predetermined shape; a step (b) of sintering a powder-press-molded body; and a step (c) of performing sizing on a sintered body.

First, in the powder-press-molding step (a), the raw-material powder is prepared by mixing of the Cu powder, the SUS powder, and the pure Fe powder with a V-shaped mixer or the like. When necessary, a raw-material powder may be prepared which is obtained by further mixing various powders such as the Fe-phosphide powder, the low-melting-point-metal powder, and the graphite powder. Here, mixing rates of the powders are set in accordance with the above-mentioned containing rates of the powders with respect to the raw-material powder as a whole.

Note that, when the Fe-phosphide powder is mixed, in order to enhance dispersibility of the Fe-phosphide powder, a mixture of the pure Fe powder and the Fe-phosphide powder may be prepared in advance, and a powder mixture thus obtained (powder mixture of Fe and $Fe_3P$) may be mixed with the Cu powder and the SUS powder. Alternatively, for the same purpose, the Cu powder maybe partially brought into contact with a surface of the pure Fe powder in advance so that this contact part is alloyed, and the alloyed contact part (partial alloy body of the pure Fe powder and the Cu powder) may be mixed with the SUS powder so as to be used as a raw-material powder. Such method is especially effective in a case where a fine Cu powder especially poor in dispersibility (for example, Cu powder having the grain size described above as an example) is used.

Figure 3:
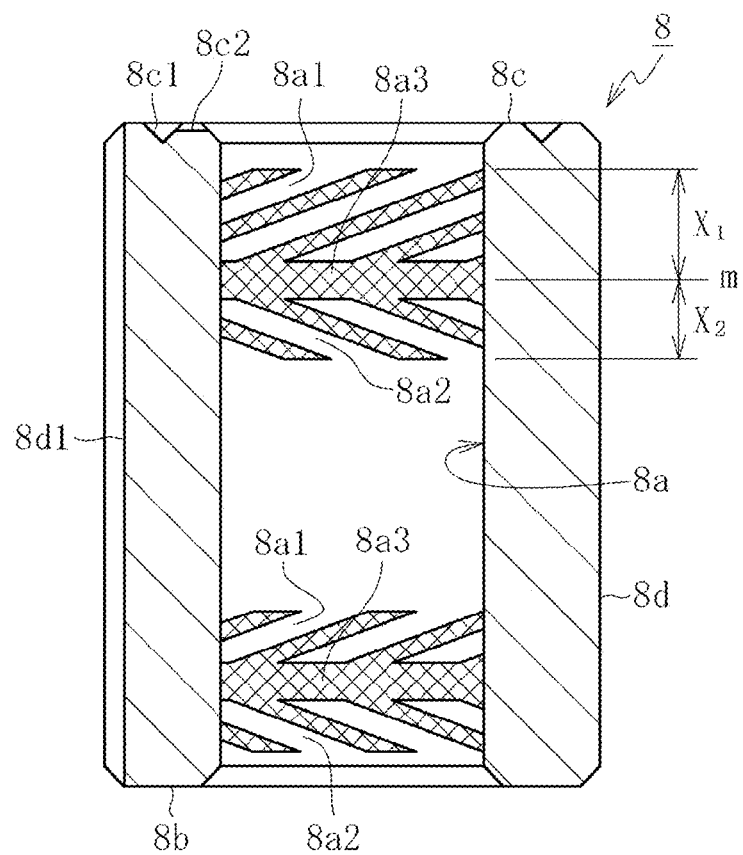
[FIG. 3] A sectional view of the sintered metal bearing according to the first invention.

Next, a molding die is prepared which has a powder filling space in a shape in conformity with that of a finished product (for example, cylindrical shape illustrated in FIG. 3). The above-mentioned raw-material powder is charged in the die and pressed at a predetermined pressure. In this manner, a powder-press-molded body is obtained which has a shape in conformity with that of the above-mentioned die. In this case, a pressing condition is set such that a density of the powder-press-molded body is set, for example, to 6.5 $g/cm^3$ or more and 7.0 $g/cm^3$ or less.

Next, the above-mentioned powder-press-molded body is heated at a predetermined sintering temperature (in this case, at a temperature lower than the melting point of Cu (1,083° C.)) for a predetermined time period. With this, at least the Cu powder and the pure Fe powder are sintered with each other, with the result that a sintered body can be obtained which is formed of a sintered metal composition having at least a Cu composition, an SUS composition, and a pure Fe composition (the sintering step (b)). Here, when a sintering temperature is substantially equal to the melting point of Cu, a melting rate of the Cu powder increases, with the result that molten Cu compositions enter an inside of the bearing. Thus, it is difficult to maintain the Cu compositions on the bearing surface. Further, when sintering is performed at a temperature by far lower than the melting point of Cu, a sufficient sintering action itself cannot be expected. In view of this, it is preferred to set the sintering temperature to fall within a range of, for example, 750° C. or more and 1,060° C. or less.

By sizing of the sintered body thus obtained for the purpose of correction of a dimension or a shape thereof (the sizing step (c)), the sintered metal bearing is finished. By this sizing, the sintered body is reshaped to have a dimension or into a shape in conformity with that of a finished product, and a surface aperture rate of the bearing surface is adjusted to a predetermined rate. Note that, for the purpose of reduction of the number of surface apertures and an area of each of the surface apertures in an inner peripheral surface, rotary sizing may be performed together with or instead of the above-mentioned sizing. With this sizing, the surface aperture rate of the inner peripheral surface is adjusted to be further lower (for example, to 10% or less). Thus, even when the sintered metal bearing is used by being incorporated in a fluid dynamic bearing device described below, an oil film having a predetermined film thickness can be easily formed on the bearing surface.

Further, when the above-mentioned sintered metal bearing is used as an oil-impregnated sintered bearing, an oil-retaining step (d) may be set after the sizing step (c). In other words, the oil-impregnated sintered bearing may be manufactured as follows: after inner pores of the sintered metal bearing are impregnated with a lubricant such as a lubricating oil by a vacuum impregnation method or the like, the lubricating oil on the surface is appropriately removed.

Here, a volume fraction (100−pore fraction (%)) of the above-mentioned sintered metal bearing is preferred to be set in accordance with actual uses; for example, set within a range of 75% or more and 95% or less (5% or more and 25% or less on a pore-fraction basis). For example, as in the case where the sintered metal bearing is used by being incorporated in the fluid dynamic bearing device described below, when the inner pores are impregnated with the lubricating oil, it is preferred to set the volume fraction to be relatively high (8% or more and 18% or less on a pore-fraction basis) so that the lubricating oil can be smoothly supplied to the bearing surface (bearing gap) and that the lubricating oil can be retained in the inner pores by such an amount as to be supplied into the bearing gap even when an oil amount decreases in accordance with temperature change. Note that, here, the term "pore fraction" represents a rate of a total sum of a volume of each of the inner pores with respect to a unit volume of the sintered metal bearing; specifically, calculated by the following equation.

pore fraction (%)=100−density ratio (%)={1−($\rho1/\rho0$)}×100

$\rho1$: Sintering density of the sintered metal bearing (with regard to a measurement method, refer to the section of dry density according to JIS Z 2501)

$\rho0$: Actual density of a substance having the same composition as that of the sintered metal bearing It has been found that the pore fraction substantially linearly decreases in accordance with an increase in the density ratio. Thus, as a result of calculation of the density ratio, the pore fraction can be obtained.

It suffices that the surface aperture rate is also set in accordance with actual uses, for example to 2% or more and 15% or less as for a use for a fluid dynamic bearing device. In particular, as described below, when dynamic pressure generating portions for generation of a dynamic pressure action of the lubricating oil (in FIG. 3, regions in each of which dynamic pressure generating grooves 8a1 and 8a2 are arranged) are provided, for example, on the inner peripheral surface of the sintered metal bearing, it is preferred to set a surface aperture rate of the inner peripheral surface to be relatively low (for example, 2% or more and 10% or less) for the purpose of preventing release of oil pressure. Here, the term "surface aperture" represents a part at which a pore formed in the sintered metal bearing as a porous composition is opened in an outer surface. Further, the term "surface aperture rate" represents an area rate of a surface aperture with respect to a unit area of the outer surface, and is measured and evaluated under the following conditions.

(Measuring Tools)
Metallurgical microscope: Nikon ECLIPSS ME600
Digital camera: Nikon DXM1200
Photography application: Nikon ACT-1 ver. 1
Image-processing application: Inotech QUICK GRAIN (Measuring Conditions)
Photographing: shutter speed at 0.5 seconds
Binary threshold: 235

The sintered metal bearing according to the description hereinabove is excellent in abrasion resistance, strength, and slidability, and hence is suitably used, for example, as a bearing device for a spindle motor of the following: a magnetic disk drive such as an HDD; an optical disk drive for a CD-ROM, a CD-R/RW, a DVD-ROM/RAM, or the like; or a magneto-optical disk drive for an MD, an MO, or the like, or as a bearing device for motors such as a polygon scanner motor for a laser beam printer (LBP), a color-wheel motor for a projector, and a fan motor.

FIG. 1 is a sectional view of a fluid dynamic bearing device 1 incorporating a sintered metal bearing 8 according to the present invention; specifically, is a main-part sectional view of a disk drive motor of an HDD including the fluid dynamic bearing device 1, illustrating an example of the above-mentioned uses. The motor includes the fluid dynamic bearing device 1 for rotatably supporting a shaft member 2 attached with a hub 3, a stator coil 4 and a rotor magnet 5 opposed to each other through an intermediation of a radial gap, and a bracket 6. The stator coil 4 is fixed to the bracket 6, and the rotor magnet 5 is fixed to the hub 3. A housing 7 of the fluid dynamic bearing device 1 is fixed along an inner periphery of the bracket 6. Further, as illustrated in the figure, one or a plurality of disks D (two in FIG. 1) is held on the hub 3. In the spindle motor configured as described above, when the stator coil 4 is energized, the rotor magnet 5 is rotated with an excitation force generated between the stator coil 4 and the rotor magnet 5. In accordance therewith, the disks D held on the hub 3 are integrally rotated with the shaft member 2.

Figure 2:
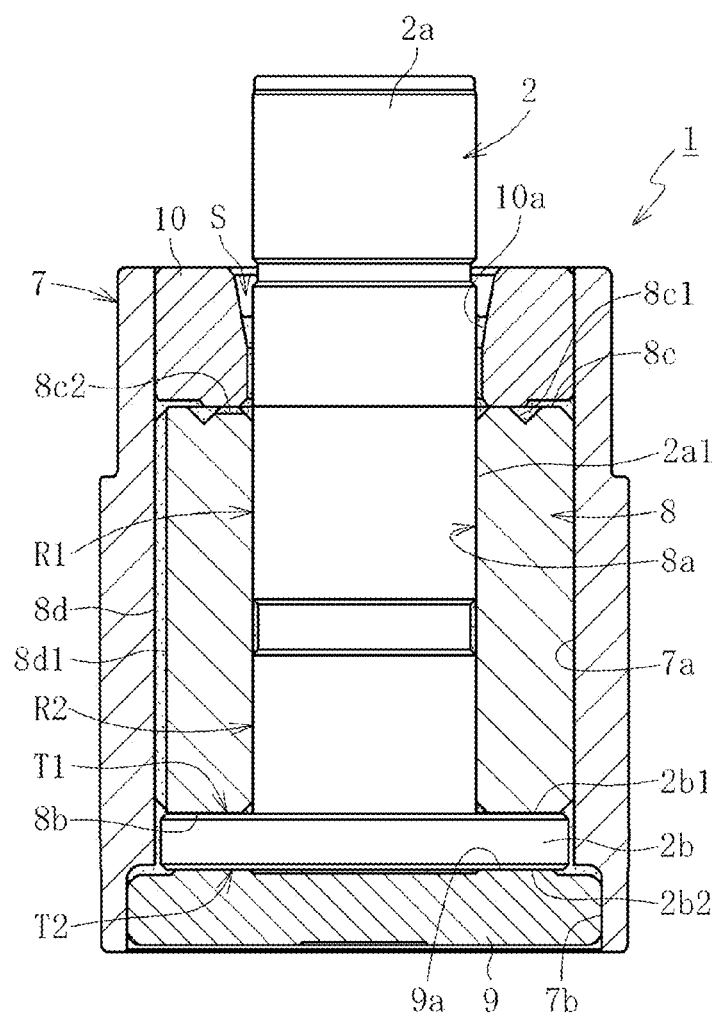
[FIG. 2] A sectional view of the fluid dynamic bearing device.

FIG. 2 is a vertical sectional view of the fluid dynamic bearing device 1. The fluid dynamic bearing device 1 includes the shaft member 2, the housing 7, the sintered metal bearing 8 which is fixed to the housing 7 and has an inner periphery on which the shaft member 2 is arranged, a lid member 9 for closing one end of the housing 7, and a sealing member 10 arranged on another-end-opening side of the housing.

The shaft member 2 includes a shaft portion 2a and a flange portion 2b provided integrally with or separately from a lower end of the shaft portion 2a. On an outer periphery of the shaft portion 2a, there is formed a radial bearing surface 2a1 facing, in a radial direction, the regions in each of which the dynamic pressure generating grooves 8a1 and 8a2 are arranged, the dynamic pressure generating grooves 8a1 and 8a2 being provided in an inner peripheral surface 8a of the sintered metal bearing 8 described below. In this embodiment, the radial bearing surface 2a1 is provided at two parts separately in an axial direction. Under a state in which the shaft portion 2a is inserted along the inner periphery of the sintered metal bearing 8, respective radial bearing gaps of radial bearing portions R1 and R2 described below are formed between the radial bearing surfaces 2a1 and 2a1 and the inner peripheral surface 8a (refer to FIG. 2). The shaft member 2 having the structure described above maybe formed of various metal materials, for example, formed of a ferrous material such as a stainless steel in consideration of strength, rigidity, abrasion resistance, and the like.

The housing 7 is substantially cylindrically formed, for example, of a metal material such as brass or a resin material, and exhibits such a form that both axial ends thereof are opened. To an inner peripheral surface 7a of the housing 7, an outer peripheral surface 8d of the sintered metal bearing 8 is fixed by appropriate means such as bonding (including loose bonding and press-fit bonding), press fitting, and adhesion (including ultrasonic adhesion and laser adhesion). Further, on a lower end side of the inner peripheral surface 7a, there is formed a fixing surface 7b, which is larger in diameter than the inner peripheral surface 7a, for fixation of the lid member 9 described below. In a case where the housing 7 is made of a resin material, any one of a thermoplastic resin and a thermosetting resin may be used. Examples of the thermoplastic resin include a crystalline resin typified by liquid crystal polymer (LCP), polyphenylene sulfide (PPS), polyether ether ketone (PEEK), polyoxymethylene (POM), polyamide (PA), and the like, or an amorphous resin typified by polyphenylsulfone (PPSU), polyethersulfone (PES), polyetherimide (PEI), polyamide-imide (PAI), and the like. Any one of or a composite of two or more types of the above-mentioned resin materials may be used.

Further, when necessary, one of or a composite of a plurality of types of fiber filler such as glass fiber or carbon fiber, whisker filler such as potassium titanate, scale-like filler such as mica, carbon black, black lead, or powder filler such as metal powder or organic powder may be used while being filled in (added to) the above-mentioned resin materials. As a matter of course, the material of the housing 7 is not limited to resins. For example, metals such as copper-based alloys or other materials can be employed. Further, formation methods therefor are not particularly limited as well. For example, other than a trimming process, there may be employed plastic processes such as forging and pressing, or metal injection molding such as MIM.

In this embodiment, the sintered metal bearing 8 exhibits a cylindrical shape having a porous structure. On the entire or a part of the inner peripheral surface 8a of the sintered metal bearing 8, the regions in each of which a plurality of dynamic pressure generating grooves are arranged are formed as radial dynamic pressure generating portions. In this embodiment, for example, as illustrated in FIG. 3, the regions in each of which the plurality of dynamic pressure generating grooves 8a1 and 8a2 each having a different inclination angle are arranged in a herringbone pattern are formed at two parts separately in the axial direction. Further, in this embodiment, for the purpose of generation of intentional circulation of the lubricating oil in the bearing, the region on one side (upper side in this case) in which the dynamic pressure generating grooves 8a1 and 8a2 are arranged is formed asymmetrically in the axial direction. With reference to a form illustrated as an example in FIG. 3, the upper region is formed such that an axial dimension $X_1$ of a region, in which the dynamic pressure generating grooves 8a1 are arranged, on an upper side with respect to an axial center m (sealing-member-10 side) of a region between the dynamic pressure generating grooves 8a1 and 8a2 adjacent to each other in the axial direction (what is called a band portion 8a3) is larger than an axial dimension $X_2$ of a region, in which the dynamic pressure generating grooves 8a2 are arranged, on a lower side. Note that, the region, in which the dynamic pressure generating grooves 8a1 and 8a2 are arranged and which is positioned on the lower side of the inner peripheral surface 8a (side near a thrust bearing gap described below), is formed symmetrically in the axial direction with respect to a band portion 8a3 over the axial center.

Figure 4:
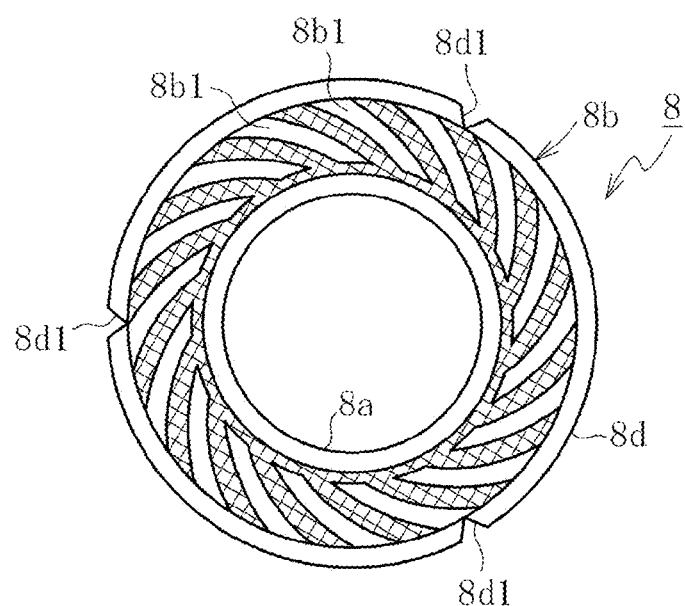
[FIG. 4] A plan view of the sintered metal bearing.

As illustrated in FIG. 4, on the entire or a part of a lower end surface 8b of the sintered metal bearing 8, as a thrust dynamic pressure generating portion, there is formed a region in which a plurality of dynamic pressure generating grooves 8b1 are arranged in a spiral pattern. The region in which the dynamic pressure generating grooves 8b1 are arranged faces an upper end surface 2b1 of the flange portion 2b under a state of a finished product, and forms, at a time of rotation of the shaft member 2, a thrust bearing gap of a first thrust bearing portion T1 described below (refer to FIG. 2) between the region and the upper end surface 2b1.

As illustrated in FIG. 3, at a radial central position of an upper end surface 8c of the sintered metal bearing 8, there is formed an annular groove 8c1 having a wedge-like shape in cross-section. Further, on an inner peripheral side with respect to the annular groove 8c1 of the upper end surface 8c, a radial groove 8c2 connecting the annular groove 8c1 and the inner peripheral surface 8a is formed at a plurality of parts in a circumferential direction. Together with axial grooves 8d1 described below, those annular groove 8c1 and radial grooves 8c2 form circulation paths for the lubricating oil in a space in the bearing. With this, a smooth supply state of the lubricating oil is secured.

The plurality of (for example, three) axial grooves 8d1 extending in the axial direction are formed in the outer peripheral surface 8d of the sintered metal bearing 8. Those axial grooves 8d1 are formed at positions separated equiangularly from each other.

As described above, the regions of the inner peripheral surface 8a, in each of which the dynamic pressure generating grooves 8a1 and 8a2 are arranged, are molded in the inner peripheral surface 8a of the sintered body (sintered metal bearing 8) by a groove-sizing process performed additionally and subsequently to dimension sizing and rotary sizing in the above-mentioned sizing step (c). Specifically, the cylindrical sintered body is compressed in the radial direction, and an outer peripheral surface of a molding die (molding rod) having a plurality of projecting portions corresponding to the dynamic pressure generating grooves 8a1 and 8a2 is pressed onto an inner peripheral surface of the cylindrical sintered body so that the inner peripheral surface undergoes plastic deformation in conformity with the die. In this manner, the dynamic pressure generating grooves 8a1 and 8a2 are transfer-molded. In this case, when the sintered body is obtained at a temperature equal to or lower than the melting point of Cu, a large number of granular compositions of Cu are left on the inner peripheral surface of the sintered body, with the result that moldability in the groove-sizing process is satisfactorily secured. Thus, the dynamic pressure generating grooves 8a1 and 8a2 or the regions in each of which the dynamic pressure generating grooves 8a1 and 8a2 are arranged can be molded with high accuracy. In particular, in the regions in each of which the dynamic pressure generating grooves 8a1 and 8a2 having the shape illustrated in FIG. 3 are arranged, of the inner peripheral surface of the sintered body prior to the sizing, regions between the dynamic pressure generating grooves 8a1 and 8a1 arranged in the circumferential direction and the band portion 8a3 as a region between the dynamic pressure generating grooves 8a1 and 8a2 arranged in the axial direction (all of which are indicated by cross-hatching in FIG. 3) are swelled relatively to the periphery thereof. In this manner, the dynamic pressure generating grooves 8a1 and 8a2 are molded. Thus, a structure in which Cu compositions are left on the inner peripheral surface of the sintered body acts effectively on moldability or molding accuracy of the dynamic pressure generating grooves 8a1 and 8a2. Note that, by a similar method, the region of the lower end surface 8b, in which the dynamic pressure generating grooves 8b1 are arranged, can also be molded at the time of above-mentioned groove sizing process or the dimension sizing.

The lid member 9 for closing a lower end side of the housing 7 is formed, for example, of a metal material or a resin material, and fixed to the fixing surface 7b provided at an inner-periphery lower end of the housing 7. In this case, conventional well-known means such as bonding, press-fitting, adhesion, and welding can be employed for fixation of the lid member 9. As a matter of course, a fixing form of the lid member 9 is not limited to the illustrated form. For example, a part cylindrically projecting from an outer rim to an upper-end-surface-9a side may be provided, and an outer peripheral surface of the profecting portion and the fixing surface 7b on an inner peripheral side of the housing 7 may be fixed to each other. Alternatively, an inner peripheral surface of the projecting portion and an outer peripheral surface on the lower end side of the housing 7 may be fixed to each other.

On the entire or a part of the upper end surface 9a of the lid member 9, there is formed a dynamic-pressure-generating-groove arrangement region having an arrangement pattern similar, for example, to that illustrated in FIG. 4 (reverse in spiral direction). The dynamic-pressure-generating-groove arrangement region faces a lower end surface 2b2 of the flange portion 2b under the state of a finished product, and forms, at the time of rotation of the shaft member 2, a thrust bearing gap of a second thrust bearing portion T2 described below (refer to FIG. 2) between the region and the lower end surface 2b2.

In this embodiment, the sealing member 10 as sealing means is formed separately from the housing 7, and is fixed to an upper-end inner periphery of the housing 7 by appropriate means such as press-fitting, bonding, adhesion, and welding. Here, the sealing member 10 is fixed to the housing 7 under a state in which a lower end surface of the sealing member 10 is held in contact with the upper end surface 8c of the sintered metal bearing 8. Note that, a material of the sealing member 10 is not particularly limited. Except materials having a risk of occurrence of oil leakage, such as a porous material, various metal materials or resin materials may be used. Alternatively, a porous material subjected to pore sealing such as coating of a surface exposed to the outside air can be used as the sealing member 10. As a matter of course, any one of the sealing member 10 and the lid member 9 may be formed of the same material as that of the housing 7 integrally therewith.

A sealing surface 10a having a tapered shape is formed on an inner periphery of the sealing member 10, and a seal space S is formed between the sealing surface 10a and an upper outer-peripheral surface of the shaft portion 2a. Under a state in which the lubricating oil is charged in the fluid dynamic bearing device 1, an oil surface of the lubricating oil is constantly maintained within the seal space S.

After the above-mentioned components are assembled by a predetermined procedure into a form illustrated in FIG. 2, the lubricating oil is charged into a bearing inner space (dotted region in FIG. 2). As a result, inner pores of the sintered metal bearing 8 are impregnated with the lubricating oil, and other spaces (radial bearing gaps and the like) are filled with the lubricating oil. In this manner, the fluid dynamic bearing device 1 as a finished product is obtained. Various oils can be used as the lubricating oil filling the inside of the fluid dynamic bearing device 1. Specifically, as the lubricating oil supplied to the fluid dynamic bearing device 1 for a disk drive such as an HDD, it is preferred to use ester-based lubricating oils excellent in low evaporation rate and low viscosity, such as dioctyl sebacate (DOS) and dioctyl azelate (DOZ) in consideration of temperature change during use and transportation.

In the fluid dynamic bearing device 1 configured as described above, when the shaft member 2 is rotated, the regions of the sintered metal bearing 8, in each of which the dynamic pressure generating grooves 8a1 and 8a2 are arranged, are opposed to the radial bearing surfaces 2a1 and 2a1 of the shaft portion 2a through an intermediation of radial bearing gaps. Then, in accordance with the rotation of the shaft member 2, in any of the upper and lower regions in each of which the dynamic pressure generating grooves 8a1 and 8a2 are arranged, the lubricating oil is pressed toward an axial center of the dynamic pressure generating grooves 8a1 and 8a2, and the pressure thereof is increased. Owing to the dynamic pressure action of the dynamic pressure generating grooves 8a1 and 8a2 as described above, the first radial bearing portion R1 and the second radial bearing portion R2 for rotatably supporting the shaft member 2 in the radial direction in a non-contact manner are formed so as to be formed at two positions while being separated from each other in the axial direction (refer to FIG. 2).

Further, in the thrust bearing gap between the region in which the dynamic pressure generating grooves 8b1 are arranged, the region being provided to the lower end surface 8b of the sintered metal bearing 8, and the upper end surface 2b1 of the flange portion 2b facing the region, and in the thrust bearing gap between the dynamic-pressure-generating-groove arrangement region provided to the upper end surface 9a of the lid member 9 and the lower end surface 2b2 of the flange portion 2b facing the region, oil films of the lubricating oil are respectively formed owing to the dynamic pressure action of the dynamic pressure generating grooves. Then, owing to the pressures of the oil films, the first thrust bearing portion T1 and the second thrust bearing portion T2 for supporting the shaft member 2 in the thrust direction in a non-contact manner are formed, respectively (refer to FIG. 2).

In this case, the sintered metal bearing 8 has a composition structure containing many SUS compositions and pure Fe compositions, and hence the inner peripheral surface 8a thereof to serve as the radial bearing surface has relatively high hardness. Thus, for example, immediately after rotation start or immediately before rotation stop of the shaft member 2 formed of SUS, even when contact sliding occurs between the outer peripheral surfaces 2a1 of the shaft portion 2a and the inner peripheral surface 8a of the sintered metal bearing 8 facing the outer peripheral surfaces 2a1, a hardness difference between both the surfaces 2a1 and 8a can be reduced, and hence abrasion between the sintered metal bearing 8 and the shaft portion 2a can be suppressed. In particular, as in this embodiment, under a state in which the hub 3 and the plurality of disks D are mounted to an upper portion of the shaft member 2, a center of gravity of a rotator including the shaft member 2 shifts to the upper side, and a moment load is high. Thus, the shaft member 2 and the sintered metal bearing 8 easily undergo contact sliding at the upper portion of the bearing. In this context, when the hardness difference between both the members 2a and 8 (hardness difference between both the sliding surfaces 2a1 and 8a) is reduced as described above, sliding abrasion caused by the contact can be suppressed as much as possible.

Further, the upper region provided to the inner peripheral surface 8a of the sintered metal bearing 8, in which the dynamic pressure generating grooves 8a1 and 8a2 are arranged, is formed asymmetrically in the axial direction with respect to the axial center of the band portion 8a3 thereof, and the axial dimension $X_1$ of the upper region with respect to the axial center is larger than the axial dimension $X_2$ of the lower region with respect thereto. Therefore, when the shaft member 2 is rotated, the drawing force (pumping force) for the lubricating oil is relatively larger in the upper region when compared to that in the lower region. Then, the lubricating oil flowing out downward from each of the radial bearing gaps owing to a difference of the drawing-in force circulates through the path constituted by the following in the following order: the thrust bearing gap of the first thrust bearing portion T1; the axial grooves 8d1 of the sintered metal bearing 8, which are positioned on a radially outer side of the thrust bearing gap; the axial gap between the upper end surface 8c and the lower end surface of the sealing member 10; the annular groove 8c1; and the radial grooves 8c2, so as to be re-drawn into the radial bearing gap of the first radial bearing portion R1.

As described above, with the structure which allows the lubricating oil to flow and circulate in the inner space of the bearing including the radial bearing gap, it is possible to prevent a phenomenon that the pressure of the lubricating oil in the inner space locally becomes negative and to solve the problems such as generation of air bubbles involved in generation of the negative pressure, leakage of the lubricating oil and deterioration in bearing performance due to the generation of air bubbles, and occurrence of vibration. Even when air bubbles are mixed in the lubricating oil for some reason, the air bubbles are discharged to the outside air from the oil surface (air liquid interface) of the lubricating oil in the seal space S when the air bubbles circulate in the above-mentioned circulation path with the lubricating oil, and hence the adverse effect due to the air bubbles is more effectively prevented.

Hereinabove, although description is made of one use example of the sintered metal bearing 8 according to the first invention, the fluid dynamic bearing device 1 to which this bearing is applicable is not limited to this example.

Figure 5:
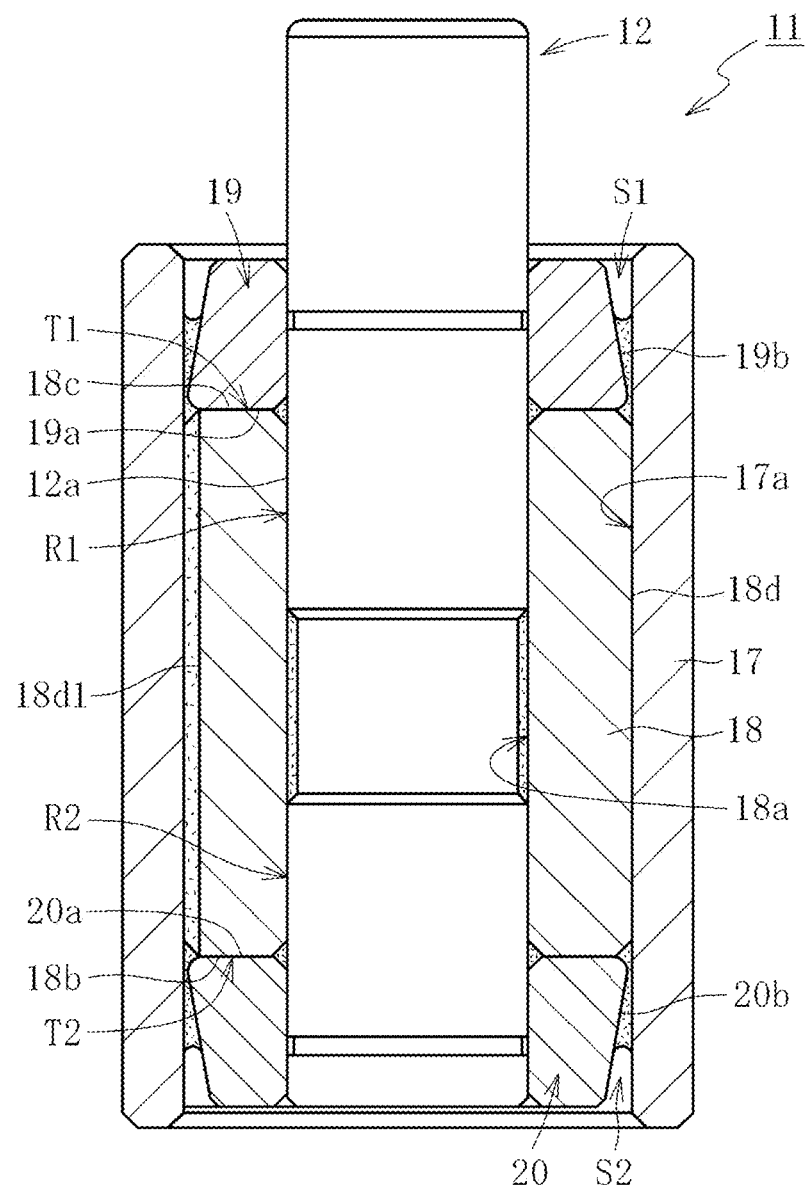
[FIG. 5] A sectional view of a fluid dynamic bearing device according to another embodiment of the first invention.

For example, in the above-mentioned use example, description is made of a case where the fluid dynamic bearing device provided with the sintered metal bearing 8 has such a form that the thrust bearing portions T1 and T2 are formed respectively on both-end-surface-2b1-and-2b2 side of the flange portion 2b provided at one end of the shaft portion 2a. In this context, an axial clearance between those thrust bearing portions T1 and T2 may be changed. FIG. 5 illustrates an example of the changed clearance. A fluid dynamic bearing device 11 illustrated in FIG. 5 has a form different from the fluid dynamic bearing device 1 illustrated in FIG. 2 mainly in that two seal spaces S1 and S2 are arranged at both ends of a housing 17 and in that the thrust bearing portions T1 and T2 are formed at both ends of a sintered metal bearing 18.

In this illustration, the sintered metal bearing 18 according to the present invention has a lower end surface 18b provided with a dynamic-pressure-generating-groove arrangement region of the pattern illustrated in FIG. 4 (reverse in spiral direction with respect to that illustrated in FIG. 4) and an upper end surface 18c also provided with the dynamic-pressure-generating-groove arrangement region. Thus, the first thrust bearing portion T1 is provided between a lower end surface 19a of a first sealing member 19 and the upper end surface 18c of the sintered metal bearing 18, and the second thrust bearing portion T2 is provided between an upper end surface 20a of a second sealing member 20 and the lower end surface 18b of the sintered metal bearing 18. Further, the first seal space S1 is formed between an outer peripheral surface 19b of the first sealing member 19 fixed to a shaft member 12 and an inner peripheral surface 17a at an upper end of the housing 17, which faces the outer peripheral surface 19b, and the second seal space S2 is formed between an outer peripheral surface 20b of the second sealing member 20 and the inner peripheral surface 17a at a lower end of the housing 17, which faces the outer peripheral surface 20b. Note that, similarly to the case of the fluid dynamic bearing device 1 illustrated in FIG. 2, the radial bearing portions R1 and R2 are formed between an inner peripheral surface 18a provided with the radial dynamic pressure generating portions illustrated as an example in FIG. 3 and an outer peripheral surface 12a of the shaft member 12, which faces the inner peripheral surface 18a.

In the fluid dynamic bearing device 11 according to this embodiment, the clearance between both the thrust bearing portions T1 and T2 is large in comparison to those of the fluid dynamic bearing device 1 illustrated in FIG. 2, which enables, as a whole of the bearing, enhancement of a bearing capacity against the moment load. Thus, even when a rotary weight increases due to an increase in the number of disks in accordance with a capacity increase of information apparatuses such as an HDD, sliding abrasion caused by the contact of the sintered metal bearing 18 with respect to the shaft member 12 can be reduced (suppressed).

Figure 6:
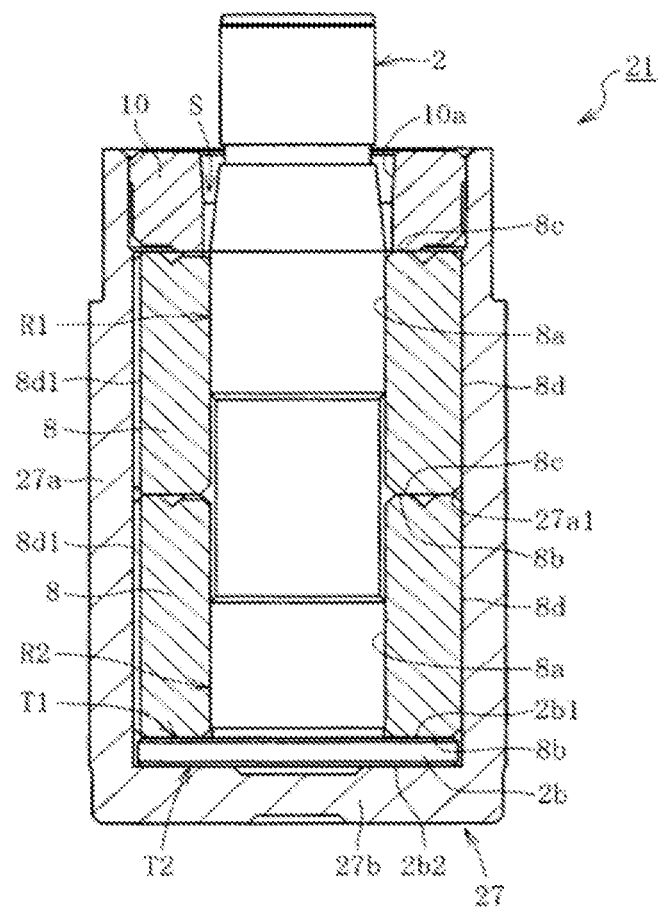
[FIG. 6] A sectional view of a fluid dynamic bearing device according to still another embodiment of the first invention.

FIG. 6 is a sectional view of a fluid dynamic bearing device 21 according to still another embodiment. In the fluid dynamic bearing device 21 illustrated in FIG. 6, two sintered metal bearings 8 are superimposed on each other in the axial direction, and those sintered metal bearings 8 and 8 are fixed to an inner peripheral surface 27a1 of a bottomed-cylindrical housing 27 constituted by a cylindrical portion 27a and a bottom portion 27b. Of the two sintered metal bearings 8 superimposed on each other in the axial direction, the upper sintered metal bearing 8 is provided with the region in which the dynamic pressure generating grooves 8a1 and 8a2 are asymmetrically arranged, the region being illustrated as an example in FIG. 3 and provided only on the sealing-member-10 side. The lower sintered metal bearing 8 is provided with the region in which the dynamic pressure generating grooves 8a1 and 8a2 are symmetrically arranged, the region being illustrated as an example in FIG. 3 and provided only on a flange-portion-2b side. Thus, the radial bearing portions R1 and R2 are formed at farthest positions in the axial direction with respect to both the sintered metal bearings 8 and 8.

As described above, in the fluid dynamic bearing device 21 illustrated in FIG. 6, a clearance between the radial bearing portions R1 and R2 is large in comparison to those of the fluid dynamic bearing devices 1 and 11 illustrated in FIGS. 2 and 5, which contributes to, as a whole of the bearing, enhancement of the bearing capacity against the moment load. Thus, even when the rotary weight increases or a rotational speed becomes higher, sliding abrasion of the sintered metal bearings 8 and 8 can be reduced, and an excellent bearing performance can be yielded over a long period of time.

Further, in the above description, the structure is exemplified in which, as the radial bearing portions R1 and R2 and the thrust bearing portions T1 and T2, the dynamic pressure action of the lubricating oil is generated owing to the dynamic pressure generating grooves in a herringbone pattern or a spiral pattern. However, the structure to which the present invention is applicable is not limited thereto.

For example, as the radial bearing portions R1 and R2, while not shown, it is also possible to adopt a so-called stepped dynamic pressure generating portion in which axial grooves are formed at a plurality of points in the circumferential direction, or a so-called multi-arc bearing in which a plurality of arcuate surfaces are arranged in the circumferential direction so as to form, together with the outer peripheral surface 2a1 or 12a of the shaft member 2 or 12 opposed thereto, wedge-like radial gaps (bearing gaps) therebetween.

Alternatively, a so-called perfectly cylindrical bearing can be constituted by the inner peripheral surface 8a or 18a of the sintered metal bearing 8 or 18 as the radial bearing surface which is formed as a perfectly circular inner peripheral surface in which, as dynamic pressure generating portions, the dynamic pressure generating grooves, the arcuate surfaces, or the like are not provided, and by the perfectly circular outer peripheral surface opposed to the inner peripheral surface.

Further, while not shown as well, one or both the thrust bearing portions T1 and T2 can be constituted also by a so-called stepped bearing in which a plurality of dynamic pressure generating grooves having a radial groove shape are provided at predetermined intervals in the circumferential direction in a region constituting the thrust bearing surface, or by a corrugated bearing (in which the end surface thereof has a corrugated shape such as a harmonic waveform).

Further, in the above-mentioned embodiments, although description is made of a case where all of the dynamic pressure generating portions are provided on a fixation side (the housing 27, the sintered metal bearing 8, the lid member 9, and the like), a part or the entire of the dynamic pressure generating portions may be provided on a rotation side (the shaft member 2 or 12, the flange portion 2b, the sealing members 19 and 20, and the like). Specifically, the above-mentioned dynamic pressure generating portion can be provided to at least one of the following: the outer peripheral surface 2a1 or 12a of the shaft member 2 or 12; both the end surfaces 2b1 and 2b2 of the flange portion 2b; and the lower end surface 19a and the upper end surface 20a of the sealing members 19 and 20.

Further, in the above-mentioned embodiments, although description is made of a structure in which the shaft member 2 or 12 is rotated and supported by the sintered metal bearing 8 or 18, in contrast, the present invention is applicable also to a structure in which the sintered metal bearing 8 or 18 is rotated and supported by the shaft member 2 or 12. In this case, although not shown, the sintered metal bearing 8 or 18 is fixed by bonding to a member arranged on an outside thereof so as to be rotated integrally with the outside member and supported by the shaft portion on the fixation side.

Further, in the above-mentioned embodiments, the lubricating oil is exemplified as a fluid which is filled inside the fluid dynamic bearing device 1, 11, or 21 so as to form a film of the fluid in the radial bearing gaps and the thrust bearing gaps. Otherwise, it is also possible to use a fluid capable of forming a film of the fluid, for example, gas including air, a lubricant having fluidity, such as a magnetic fluid, or a lubricating grease. As a matter of course, the sintered metal bearings according to the present invention are excellent in abrasion resistance, and hence may be used as normal sliding bearings without use of a lubricating fluid at all.

EXAMPLE 1

For verification of advantageous effects of the first invention of the present application, a radial-crushing test and an abrasion-amount measurement test were each carried out on a sintered metal bearing (Example 1) formed of a raw-material powder containing a Cu powder, an SUS powder, and a pure Fe powder at predetermined rates, and sintered metal bearings each formed of a raw-material powder having a conventional composition (Comparison Examples 1 and 2). Then, characteristics of the sintered metal bearings were evaluated relative to each other.

Here, the following were used as test materials: CE-15 manufactured by FUKUDA METAL FOIL & POWDER CO., LTD. as the Cu powder; DAP410L manufactured by Daido Steel Co., Ltd. as the SUS powder; NC100.24 manufactured by Höganäs AB as the pure Fe powder; and PNC60 manufactured by Höganäs AB as the Fe-phosphide powder. Further, in those experiments, an Sn powder and a graphite powder as low-melting-point-metal powders are used as raw-material powders; specifically, Sn-At-W350 manufactured by FUKUDA METAL FOIL & POWDER CO., LTD. was used as the Sn powder, and ECB-250 manufactured by Nippon Graphite Industries, ltd. was used as the graphite powder. A molding condition (pressing force) was set such that a density of a powder-press-molded body ranges from 6.5 to 7.0 (g/cm$^3$). A sintering temperature in Example 1 was set to 1,050° C., and a sintering temperature in Comparison Examples was set to 870° C. Formulation compositions of the raw-material powders in Example and Comparison Examples are listed in Table 1 below. In all of Example and Comparison Examples, a finished-product dimension of a test piece (sintered metal bearing) as a finished product was set as follows: φ(inner diameter) of 4 mm×φ (outer diameter) of 7.5 mm×t (axial width) of 12.4 mm. Further, the number of the test pieces was set to five in all of Example and Comparison Examples.

TABLE 1

| | Formulation composition, wt % | | | | | |
|---|---|---|---|---|---|---|
| | Cu | SUS | pure Fe | Fe$_3$P | Sn | C |
| Example 1 | 36.7 | 20 | 39.4 | 0.6 | 2.5 | 0.8 |
| Comparison Example 1 | 57.8 | | 39.9 | | 1.5 | 0.8 |
| Comparison Example 2 | 57.8 | 39.9 | | | 1.5 | 0.8 |

The measurement test of radial-crushing strength was carried out with use of the above-mentioned test pieces according to JIS Z 2507 in all of Example and Comparison Examples.

Similarly, the abrasion-amount measurement test was carried out with use of the above-mentioned test pieces by a Savan's friction-and-wear testing machine in all of Example and Comparison Examples. Testing conditions in those cases are listed below.
Material of counterpart: SUS420J2
Circumferential speed: 50 m/min
Surface pressure: 1.3 MPa
Lubricant: ester oil (12 mm$^2$/s)
Test time period: 3 hrs Table 2 below shows measurement results of the radial-crushing test and measurement results of the abrasion-amount measurement test. All values are relative values with reference to Comparison Example 1 (on the premise that detected values in Comparison Example 1 are 1).

TABLE 2

| | Abrasion-depth rate | Radial-crushing strength rate | Linear expansion coefficient rate |
|---|---|---|---|
| Example 1 | 0.16 | 1.12 | 12.3 |
| Comparison Example 1 | 1 | 1 | 14.6 |
| Comparison Example 2 | 0.08 | 0.61 | 13.7 |

First, with regard to abrasion resistance, as for the sintered metal bearing formed of the raw-material powder containing an SUS powder and a pure Fe powder (Example 1), an abrasion amount (abrasion depth and abrasion-mark area) was confirmed to be substantially equal to that of the sintered metal bearing containing only an SUS powder (Comparison Example 2). Further, values of radial-crushing strength were confirmed to be equal to or higher than those of the sintered metal bearing formed mainly of a Cu powder and an Fe powder only and not containing an SUS powder (Comparison Example 1). Still further, a value of a linear expansion coefficient of the sintered metal bearing according to Example 1 was confirmed to be minimum. Those results proved that the sintered metal bearing according to the present invention was excellent in abrasion resistance and capable of exhibiting high sintering strength.

In the following, description is made of an embodiment of a sintered metal bearing according to a second invention of the present application with reference to FIGS. 7 to 18.

The sintered metal bearing according to the present invention is formed of Fe-based compositions and Cu compositions dispersed in the Fe-based compositions, or formed mainly of those compositions. Here, a rate of the Fe-based compositions with respect to the entire composition is ten times or more of that of the Cu compositions by weight ratio. For example, when the Fe-based compositions is contained by 90 wt % or more, a containing rate of each of the Fe-based compositions and the Cu compositions in the bearing is set such that the Cu compositions are contained by 9 wt % or less. Here, for example, with use of X3000 manufactured by Hitachi High-Technologies Corporation. as an SEM, and EMAX7021H manufactured by HORIBA, Ltd. as an EDS, quantitative analyses of Fe and Cu were carried through elemental analyses. Then, judgments were made based on mass concentration.

The Fe-based compositions may contain any one of an Fe composition and a composition of an Fe-based alloy such as SUS, or contain both the compositions. Further, as described above, when the rate of the Fe-based compositions is largely increased with respect to the entire composition (for example, 90 wt % or more), it is preferred that the Fe-based compositions be formed of Fe having a melting point relatively lower than those of SUS and the like. This is because, at the time of sintering, a sufficient sintering action can be obtained between the raw-material powders (for example, Fe powder and Cu powder), and sintering strength can be easily secured.

The Cu compositions forming a sintered metal composition together with the Fe-based compositions each mainly has a granular shape. Here, a size of each of the Cu compositions (longitudinal width, area, and the like of granular compositions) may be smaller as a whole than those of the Fe-based compositions. Such compositions can be obtained, for example, through use of a Cu powder having a grain size finer than that of Fe-based powder as one component of the raw-material powder. When Cu compositions finer than Fe-based compositions are contained in this manner, a contact area (in other words, contact parts) with respect to the Fe-based compositions increases. Thus, even when a formulation rate of the Fe powder is greatly increased (even at 90 wt % or more), strength of the bearing can be secured. Further, in comparison to a bearing formed of Cu compositions having the same size as those of Fe-based compositions, the sintered metal bearing according to the present invention has a higher rate (area or exposed parts) of Cu compositions exposed on a surface of the bearing, such as the bearing surface. Thus, slidability can be easily secured even at a low rate of the Cu compositions.

Further, in terms of enhancement of slidability of the bearing surface or securement of processability of the sintered body, the rate of the Cu compositions with respect to the entire composition should be as high as possible. However, as described above, when the Cu compositions are smaller in size than the Fe-based compositions, the rate of the Cu compositions may be set to be relatively low. Specifically, the rate of the Cu compositions with respect to the entire composition may be set to 1.0 wt % or more and 9.0 wt % or less. This is because, when the formulation rate of the Cu compositions is less than 1.0 wt %, it is difficult to expose the Cu compositions on the bearing surface; further, even when the Cu compositions are exposed, it is difficult to sufficiently exert satisfactory slidability (conformability) with respect to the counterpart. Further, when the Cu compositions are contained by more than 9.0 wt %, it is difficult to maintain the rate of the Fe-based compositions with respect to the entire composition to be ten times (90 wt %) or more of the Cu compositions. This is because, as described below, bearings of this type normally contain a predetermined amount of other compositions such as Sn compositions and graphite other than the main Fe-based compositions and Cu compositions.

Further, still other compositions may be contained in addition to the above-mentioned compositions. For example, metal compositions each having a melting point further lower than that of the Cu composition (for example, compositions formed of low-melting-point metals such as Sn) may be contained. That is, the above-mentioned sintered metal bearing may be formed of Fe-based compositions, Cu compositions, and low-melting-point metal compositions. Such metal compositions are molten (liquid-phased) at the time of sintering, and act as a binder between Fe-based powders or between the Cu powder and the Fe-based powder. Thus, even when a sintering action between the Fe-based powders is insufficient, a binding force between the powders can be reinforced so as to enhance strength of the sintered body (sintered metal bearing). The low-melting-point metals include any metal to be molten at a predetermined sintering temperature (here, temperature lower than the melting point of Cu). For example, metals such as Sn, Zn, Al, and P, or alloys containing two or more of those metals are applicable.

Further, for the purpose of improvement of moldability or mold-releasability at the time of compression molding, or slidability of a finished product, graphite compositions may be further contained in the above-mentioned metal compositions. In this case, the above-mentioned sintered metal bearing is formed of Fe-based compositions, Cu compositions, and lower-melting-point-metal compositions, and graphite compositions.

A volume fraction (100−pore fraction (%)) of the sintered metal bearing formed of the compositions of the above-mentioned formulation is preferred to be set in accordance with actual uses; for example, set within a range of 75% or more and 95% or less (5% or more and 25% or less on a pore-fraction basis). For example, as in the case where the sintered metal bearing is used by being incorporated in the fluid dynamic bearing device described below, when the inner pores are impregnated with the lubricating oil, it is preferred to set the pore fraction to be relatively high (for example, 15% or more and 25% or less) so that the lubricating oil can be smoothly supplied to the bearing surface (bearing gap) and that the lubricating oil can be retained in the inner pores by such an amount as to be supplied into the bearing gap even when an oil amount decreases in accordance with temperature change. Note that, here, the term "pore fraction" represents a rate of a total sum of a volume of each of the inner pores with respect to a unit volume of the sintered metal bearing; specifically, calculated by the following equation.

$$\text{pore fraction (\%)} = 100 - \text{density ratio (\%)} = \{1 - (\rho 1/\rho 0)\} \times 100$$

$\rho 1$: Density of the sintered metal bearing (with regard to a measurement method, refer to the section of dry density according to JIS Z 2501)

$\rho 0$: Actual density of a substance having the same composition as that of the sintered metal bearing It has been found that the pore fraction substantially linearly decreases in accordance with an increase in the density ratio. Thus, as a result of calculation of the density ratio, the pore fraction can be obtained.

It suffices that the surface aperture rate is also set in accordance with actual uses, for example to 2% or more and 15% or less as for a use for a fluid dynamic bearing device. In particular, as described below, when dynamic pressure generating portions for generation of a dynamic pressure action of the lubricating oil (in FIG. 9, regions in each of which dynamic pressure generating grooves 108a1 and 108a2 are arranged) are provided, for example, on the inner peripheral surface of the sintered metal bearing, it is preferred to set a surface aperture rate of the inner peripheral surface to be relatively low (for example, 2% or more and 10% or less) for the purpose of preventing release of oil pressure. Here, the term "surface aperture" represents apart at which a pore formed in the sintered metal bearing as a porous composition is opened in an outer surface. Further, the term "surface aperture rate" represents an area rate of a surface aperture with respect to a unit area of the outer surface, and is measured and evaluated under the following conditions.

(Measuring Tools)

Metallurgical microscope: Nikon ECLIPSS ME600
Digital camera: Nikon DXM1200
Photography application: Nikon ACT-1 ver. 1
Image-processing application: Inotech QUICK GRAIN (Measuring Conditions)

Photographing: shutter speed at 0.5 seconds
Binary threshold: 235

The sintered metal bearing having the composition form described hereinabove is manufactured, for example, by a method described below. Specifically, the sintered metal bearing is manufactured through at least the following three steps: a step (a) of compression-molding the raw-material powder containing an Fe-based powder and a Cu powder into a predetermined shape; a step (b) of sintering a powder-press-molded body; and a step (c) of performing sizing on a sintered body.

First, in the powder-press-molding step (a), the raw-material powder is prepared by mixing the Cu powder in an Fe-based powder (for example, Fe powder) with a V-shaped mixer or the like. Here, for example, an Fe powder having an average grain size of 150 μm or less and a Cu powder having an average grain size of 75 μm or less are used. Further, at the time of the above-mentioned powder mixing, a mixing rate of each of the powders is set in accordance with the above-mentioned containing rates of the compositions in the finished product. For example, powders are mixed with each other so that the Fe-based powder (when Fe-based powders of a plurality of types are mixed, a total amount thereof) is ten times or more of the Cu powder by weight ratio. As a matter of course, when necessary, a mixture obtained by further mixing powders of still other types, such as an Sn powder and a graphite powder, with the above-mentioned metal powder maybe used as a raw-material powder.

Note that, in this case, in order to enhance dispersibility of the CU powder, the Cu powder may be partially brought into contact with a surface of the Fe powder in advance so that this contact part is alloyed, and the alloyed contact part (partial alloy body of the Fe powder and the Cu powder) may be used as a raw-material powder. Such method is especially effective in a case where a fine Cu powder especially poor in dispersibility (for example, Cu powder having the grain size described above as an example) is used.

Next, a molding die is prepared which has a powder filling space in a shape in conformity with that of a finished product (for example, cylindrical shape). The above-mentioned raw-material powder is supplied in the filling space in the die and pressed at a predetermined pressure. In this manner, a powder-press-molded body is obtained which has a shape in conformity with that of the above-mentioned die. In this case, a pressing condition is set such that a density of the powder-press-molded body is set, for example, to 6.0 g/cm$^3$ or more and 6.8 g/cm$^3$ or less.

Next, the above-mentioned powder-press-molded body is heated at a temperature lower than the melting point of Cu (1,083° C.) for a predetermined time period. With this, at least the Cu powder and the Fe-based powder are sintered with each other, with the result that a sintered body can be obtained which is formed of a sintered metal composition having an Fe-based composition and a CU composition (the sintering step (b)). Here, when sintering is performed at a sintering temperature too much close to the melting point of Cu, actually, a melting rate of the Cu powder increases. Thus, it is difficult to maintain the Cu granular compositions in a finished product. Further, when sintering is performed at a temperature by far lower than the melting point of Cu, a sufficient sintering action itself cannot be expected. In view of this, it is preferred to set the sintering temperature to fall within a range of, for example, 850° C. or more and 1,050° C. or less.

By sizing of the sintered body thus obtained for the purpose of correction of a dimension or a shape thereof (the sizing step (c)), the sintered metal bearing is finished. By this sizing, the sintered body is reshaped to have a dimension or into a shape in conformity with that of a finished product, and a surface aperture rate of the bearing surface is adjusted to a predetermined rate. Note that, for the purpose of reduction of the number of surface apertures and an area of each of the surface apertures in an inner peripheral surface, rotary sizing may be performed together with or instead of the above-mentioned sizing. With this sizing, the surface aperture rate of the inner peripheral surface is adjusted to be further lower (for example, to 10% or less). Thus, even when the sintered metal bearing is used by being incorporated in a fluid dynamic bearing device described below, an oil film having a predetermined film thickness can be easily formed on the bearing surface.

Figure 8:
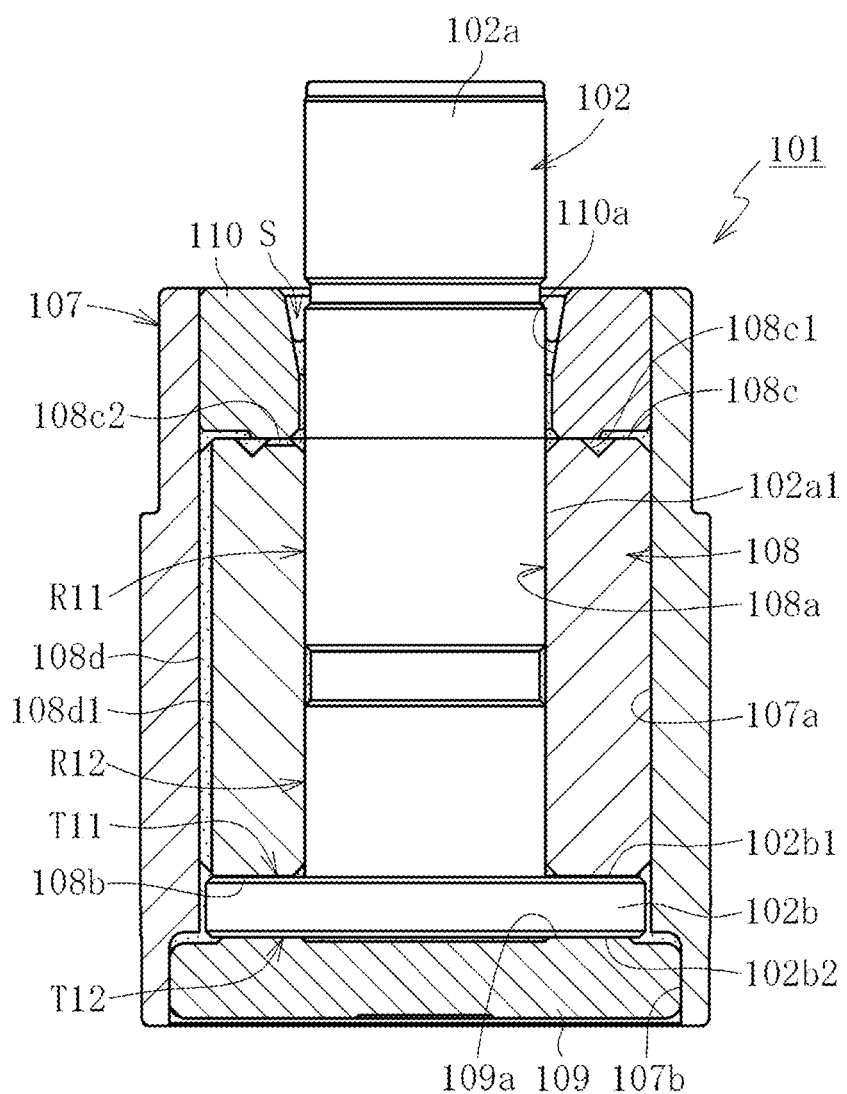
[FIG. 8] A sectional view of the fluid dynamic bearing device.
Figure 13:
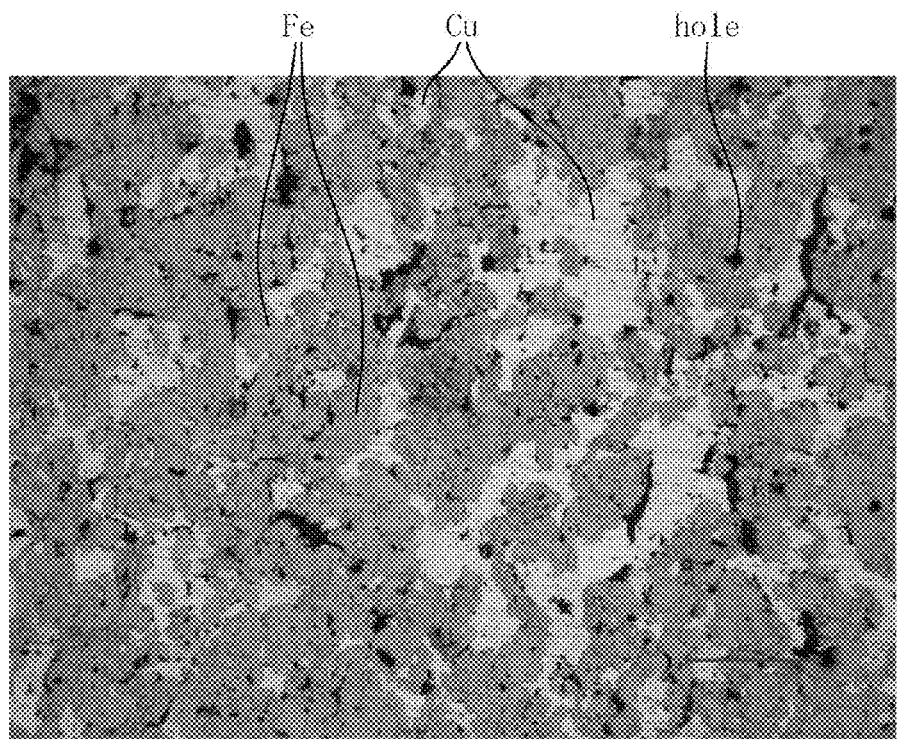
[FIG. 13] A photograph of a cross-section of the sintered metal bearing according to the embodiment.
Figure 14:
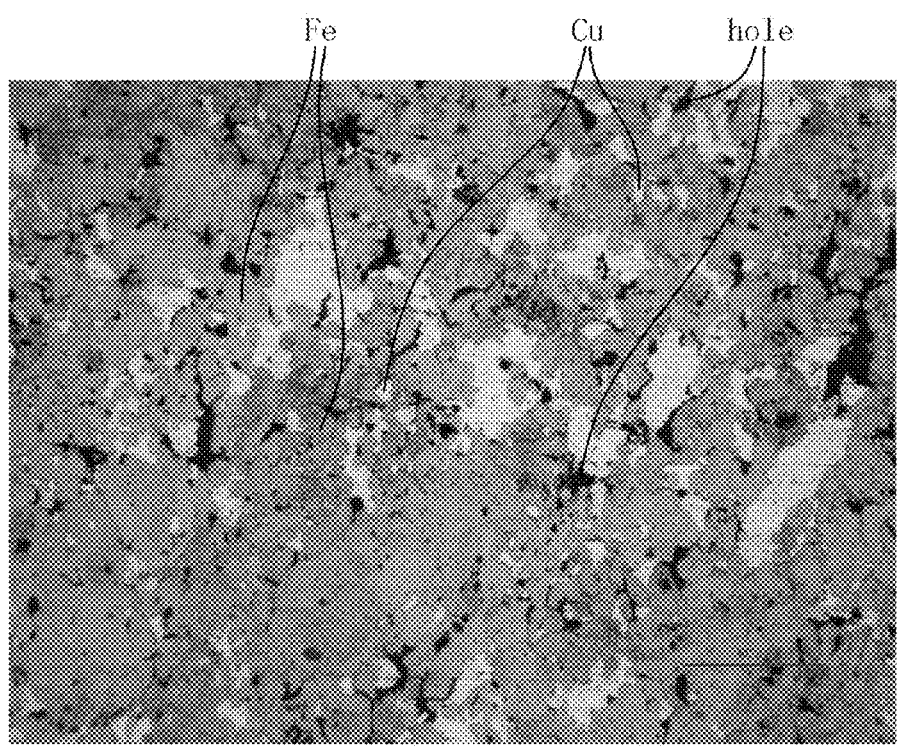
[FIG. 14] A photograph of a cross-section of the sintered metal bearing according to the another embodiment.
Figure 15:
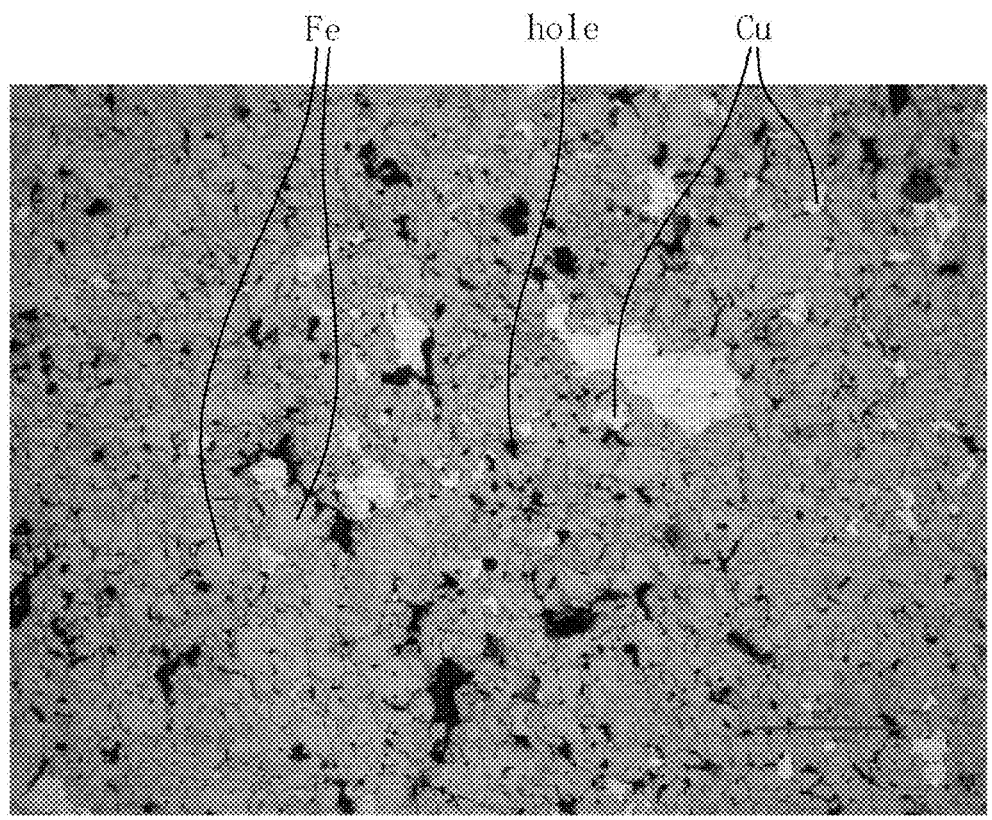
[FIG. 15] A photograph of a cross-section of the sintered metal bearing according to the still another embodiment.

Here, FIGS. 13 to 15 are each a photograph of a cross-section of the sintered metal bearing according to an example of the present invention. Each of those photographs of cross-sections was taken with VE9800 manufactured by KEYENCE CORPORATION. Observation was performed at a two hundred times magnification. Further, in the observation, the above-mentioned sintered metal bearing was cut in the axial direction, and a cut surface that has undergone lapping was used as a photographing object. FIG. 13 shows a cross-section photograph of a case of Fe compositions at 70 wt %, FIG. 8 shows a cross-section photograph of a case of Fe compositions at 80 wt %, and FIG. 15 shows a cross-section photograph of a case of Fe compositions at 90 wt %. In FIGS. 13 to 15, brightest gray parts show "Cu compositions", medium light-gray parts show "Fe compositions", and darkest gray (almost black) parts show "inner pores". Those figures (photographs) show that, although not so clear in the case of Fe compositions at 70 wt %, Cu compositions are left while being appropriately dispersed as granular compositions in the case of Fe compositions at 90 wt %. Further, all the figures show that there exist a relatively large number of pores finer than the metal compositions.

The sintered metal bearing according to the description hereinabove is excellent in abrasion resistance and slidability, and hence is suitably used, for example, as a bearing device for a spindle motor of the following: a magnetic disk drive such as an HDD; an optical disk drive for a CD-ROM, a CD-R/RW, a DVD-ROM/RAM, or the like; or a magneto-optical disk drive for an MD, an MO, or the like, or as a bearing device for motors such as a polygon scanner motor for a laser beam printer (LBP), a color-wheel motor for a projector, and a fan motor.

Figure 7:
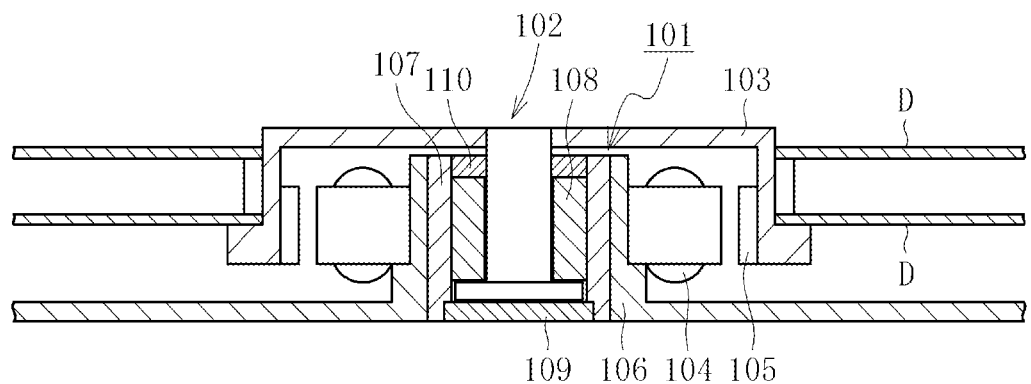
[FIG. 7] A sectional view of a fluid dynamic bearing device incorporating a sintered metal bearing according to an embodiment of a second invention of the present application, and a spindle motor including this fluid dynamic bearing device.

FIG. 7 is a sectional view of a fluid dynamic bearing device 101 incorporating a sintered metal bearing 108 according to the present invention; specifically, is a main-part sectional view of a disk drive motor of an HDD including the fluid dynamic bearing device 101, illustrating an example of the above-mentioned uses. The motor includes the fluid dynamic bearing device 101 for rotatably supporting a shaft member 102 attached with a hub 103, a stator coil 104 and a rotor magnet 105 opposed to each other through an intermediation of a radial gap, and a bracket 106. The stator coil 104 is fixed to the bracket 106, and the rotor magnet 105 is fixed to the hub 103. A housing 107 of the fluid dynamic bearing device 101 is fixed along an inner periphery of the bracket 106. Further, as illustrated in the figure, one or a plurality of disks D (two in FIG. 7) is held on the hub 103. In the spindle motor configured as described above, when the stator coil 104 is energized, the rotor magnet 105 is rotated with an excitation force generated between the stator coil 104 and the rotor magnet 105. In accordance therewith, the disks D held on the hub 103 are integrally rotated with the shaft member 102.

FIG. 8 is a vertical sectional view of the fluid dynamic bearing device 101. The fluid dynamic bearing device 101 includes the shaft member 102, the housing 107, the sintered metal bearing 108 which is fixed to the housing 107 and has an inner periphery on which the shaft member 102 is arranged, a lid member 109 for closing one end of the housing 107, and a sealing member 110 arranged on another-end-opening side of the housing.

The shaft member 102 includes a shaft portion 102a and a flange portion 102b provided integrally with or separately from a lower end of the shaft portion 102a. On an outer periphery of the shaft portion 102a, there is formed a radial bearing surface 102a1 facing, in a radial direction, regions in each of which dynamic pressure generating grooves 108a1 and 108a2 are arranged, the dynamic pressure generating grooves 108a1 and 108a2 being provided in an inner peripheral surface 108a of the sintered metal bearing 108 described below. In this embodiment, the radial bearing surface 102a1 is provided at two parts separately in an axial direction. Under a state in which the shaft portion 102a is inserted along the inner periphery of the sintered metal bearing 108, respective radial bearing gaps of radial bearing portions R11 and R12 described below are formed between the radial bearing surfaces 102a1 and 102a1 and the inner peripheral surface 108a (refer to FIG. 8). The shaft member 102 having the structure described above may be formed of various metal materials, for example, formed of a ferrous material such as a stainless steel in consideration of strength, rigidity, abrasion resistance, and the like.

The housing 107 is substantially cylindrically formed, for example, of a metal material such as brass or a resin material, and exhibits such a form that both axial ends thereof are opened. To an inner peripheral surface 107a of the housing 107, an outer peripheral surface 108d of the sintered metal bearing 108 is fixed by appropriate means such as bonding (including loose bonding and press-fit bonding), press fitting, and adhesion (including ultrasonic adhesion and laser adhesion). Further, on a lower end side of the inner peripheral surface 107a, there is formed a fixing surface 107b, which is larger in diameter than the inner peripheral surface 107a, for fixation of the lid member 109 described below. In a case where the housing 107 is made of a resin material, any one of a thermoplastic resin and a thermosetting resin maybe used. Examples of the thermoplastic resin include a crystalline resin typified by liquid crystal polymer (LCP), polyphenylene sulfide (PPS), polyether ether ketone (PEEK), polyoxymethylene (POM), polyamide (PA), and the like, or an amorphous resin typified by polyphenylsulfone (PPSU), polyethersulfone (PES), polyetherimide (PEI), polyamide-imide (PAI), and the like. Any one of or a composite of two or more types of the above-mentioned resin materials may be used.

Further, when necessary, one of or a composite of a plurality of types of fiber filler such as glass fiber or carbon fiber, whisker filler such as potassium titanate, scale-like filler such as mica, carbon black, black lead, or powder filler such as metal powder or organic powder may be used while being filled in (added to) the above-mentioned resin materials. As a matter of course, the material of the housing 107 is not limited to resins. For example, metals such as copper-based alloys or other materials can be employed. Further, formation methods therefor are not particularly limited as well. For example, other than a trimming process, there may be employed plastic processes such as forging and pressing, or metal injection molding such as MIM.

Figure 9:
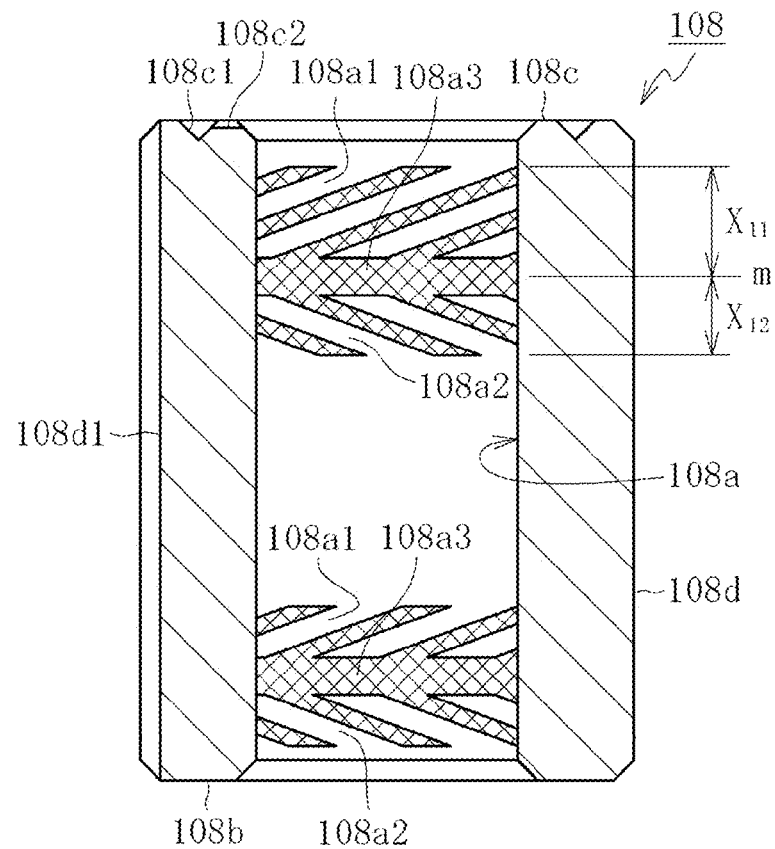
[FIG. 9] A sectional view of the sintered metal bearing according to the present invention.

In this embodiment, the sintered metal bearing 108 exhibits a cylindrical shape having a porous structure. On the entire or apart of the inner peripheral surface 108a of the sintered metal bearing 108, the regions in each of which a plurality of dynamic pressure generating grooves are arranged are formed as radial dynamic pressure generating portions. In this embodiment, for example, as illustrated in FIG. 9, the regions in each of which the plurality of dynamic pressure generating grooves 108a1 and 108a2 each having a different inclination angle are arranged in a herringbone pattern are formed at two parts separately in the axial direction. Further, in this embodiment, for the purpose of generation of intentional circulation of the lubricating oil in the bearing, the region on one side (upper side in this case) in which the dynamic pressure generating grooves 108a1 and 108a2 are arranged is formed asymmetrically in the axial direction. With reference to a form illustrated as an example in FIG. 9, the upper region is formed such that an axial dimension X11 of a region, in which the dynamic pressure generating grooves 108a1 are arranged, on an upper side with respect to an axial center m (sealing-member-110 side) of a region between the dynamic pressure generating grooves 108a1 and 108a2 adjacent to each other in the axial direction (what is called a band portion 108a3) is larger than an axial dimension X12 of a region, in which the dynamic pressure generating grooves 108a2 are arranged, on a lower side. Note that, the region, in which the dynamic pressure generating grooves 108a1 and 108a2 are arranged and which is positioned on the lower side of the inner peripheral surface 108a (side near a thrust bearing gap described below), is formed symmetrically in the axial direction with respect to a band portion 108a3 over the axial center.

Figure 10:
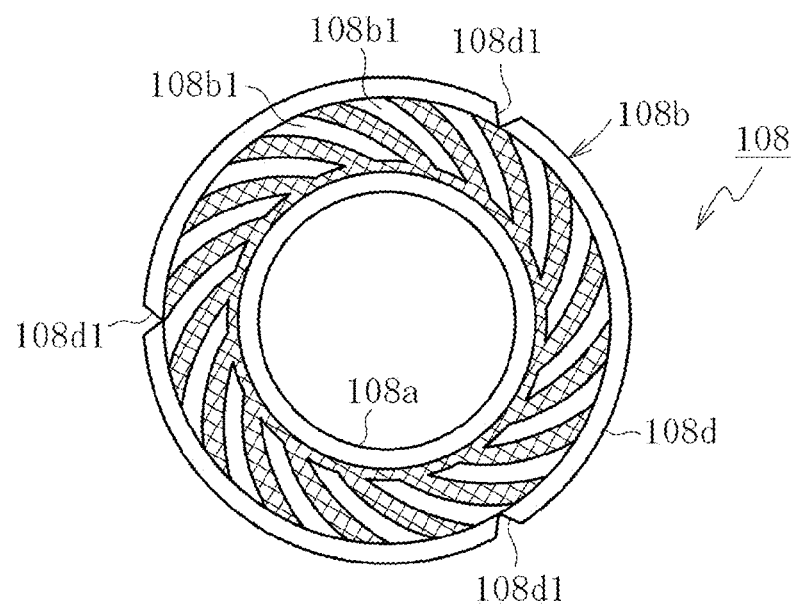
[FIG. 10] A plan view of the sintered metal bearing.

As illustrated in FIG. 10, on the entire or a part of a lower end surface 108b of the sintered metal bearing 108, as a thrust dynamic pressure generating portion, there is formed a region in which a plurality of dynamic pressure generating grooves 108b1 are arranged in a spiral pattern. The region in which the dynamic pressure generating grooves 108b1 are arranged faces an upper end surface 102b1 of the flange portion 102b under a state of a finished product, and forms, at a time of rotation of the shaft member 102, a thrust bearing gap of a first thrust bearing portion T11 described below (refer to FIG. 8) between the region and the upper end surface 102b1.

As illustrated in FIG. 9, at a radial central position of an upper end surface 108c of the sintered metal bearing 108, there is formed an annular groove 108c1 having a wedge-like shape in cross-section. Further, on an inner peripheral side with respect to the annular groove 108c1 of the upper end surface 108c, a radial groove 108c2 connecting the annular groove 108c1 and the inner peripheral surface 108a is formed at a plurality of parts in a circumferential direction. Together with axial grooves 108d1 described below, those annular groove 108c1 and radial grooves 108c2 form circulation paths for the lubricating oil in a space in the bearing. With this, a smooth supply state of the lubricating oil is secured.

The plurality of (for example, three) axial grooves 108*d*1 extending in the axial direction are formed in the outer peripheral surface 108*d* of the sintered metal bearing 108. Those axial grooves 108*d*1 are formed at positions separated equiangularly from each other.

As described above, the regions of the inner peripheral surface 108*a*, in each of which the dynamic pressure generating grooves 108*a*1 and 108*a*2 are arranged, are molded in the inner peripheral surface 108*a* of the sintered body (sintered metal bearing 108) by a groove-sizing process performed additionally and subsequently to dimension sizing and rotary sizing in the above-mentioned sizing step (c). Specifically, the cylindrical sintered body is compressed in the radial direction, and an outer peripheral surface of a molding die (molding rod) having a plurality of projecting portions corresponding to the dynamic pressure generating grooves 108*a*1 and 108*a*2 is pressed onto an inner peripheral surface of the cylindrical sintered body so that the inner peripheral surface undergoes plastic deformation in conformity with the die. In this case, a large number of granular compositions of Cu are left on the inner peripheral surface of the sintered body, and hence moldability in the groove-sizing process is satisfactorily secured. Thus, the dynamic pressure generating grooves 108*a*1 and 108*a*2 or the regions in each of which the dynamic pressure generating grooves 108*a*1 and 108*a*2 are arranged can be molded with high accuracy. In particular, in the regions in each of which the dynamic pressure generating grooves 108*a*1 and 108*a*2 having the shape illustrated in FIG. 9 are arranged, of the inner peripheral surface of the sintered body prior to the sizing, regions between the dynamic pressure generating grooves 108*a*1 and 108*a*1 arranged in the circumferential direction and the band portion 108*a*3 as a region between the dynamic pressure generating grooves 108*a*1 and 108*a*2 arranged in the axial direction (all of which are indicated by cross-hatching in FIG. 9) are swelled relatively to the periphery thereof. In this manner, the dynamic pressure generating grooves 108*a*1 and 108*a*2 are molded. Thus, a structure in which Cu granular compositions are left on the inner peripheral surface of the sintered body acts effectively on moldability or molding accuracy of the dynamic pressure generating grooves 108*a*1 and 108*a*2. Note that, by a similar method, the region of the lower end surface 108*b*, in which the dynamic pressure generating grooves 108*b*1 are arranged, can also be molded at the time of above-mentioned groove sizing process or the dimension sizing.

The lid member 109 for closing a lower end side of the housing 107 is formed, for example, of a metal material or a resin material, and fixed to the fixing surface 107*b* provided at an inner-periphery lower end of the housing 107. In this case, conventional well-known means such as bonding, press-fitting, adhesion, and welding can be employed for fixation of the lid member 109.

On the entire or a part of the upper end surface 109*a* of the lid member 109, there is formed a dynamic-pressure-generating-groove arrangement region having an arrangement pattern similar, for example, to that illustrated in FIG. 10 (reverse in spiral direction). The dynamic-pressure-generating-groove arrangement region faces a lower end surface 102*b*2 of the flange portion 102*b* under the state of a finished product, and forms, at the time of rotation of the shaft member 102, a thrust bearing gap of a second thrust bearing portion T12 described below (refer to FIG. 8) between the region and the lower end surface 102*b*2.

In this embodiment, the sealing member 110 as sealing means is formed separately from the housing 107, and is fixed to an upper-end inner periphery of the housing 107 by appropriate means such as press-fitting, bonding, adhesion, and welding. Here, the sealing member 110 is fixed to the housing 107 under a state in which a lower end surface of the sealing member 110 is held in contact with the upper end surface 108*c* of the sintered metal bearing 108. Note that, a material of the sealing member 110 is not particularly limited. Except materials having a risk of occurrence of oil leakage, such as a porous material, various metal materials or resin materials may be used. Alternatively, a porous material subjected to pore sealing such as coating of a surface exposed to the outside air can be used as the sealing member 110. As a matter of course, any one of the sealing member 110 and the lid member 109 may be formed of the same material as that of the housing 107 integrally therewith.

A sealing surface 110*a* having a tapered shape is formed on an inner periphery of the sealing member 110, and a seal space S is formed between the sealing surface 110*a* and an upper outer-peripheral surface of the shaft portion 102*a*. Under a state in which the lubricating oil is charged in the fluid dynamic bearing device 101, an oil surface of the lubricating oil is constantly maintained within the seal space S.

After the above-mentioned components are assembled by a predetermined procedure into a form illustrated in FIG. 8, the lubricating oil is charged into a bearing inner space (dotted region in FIG. 8). As a result, inner pores of the sintered metal bearing 108 are impregnated with the lubricating oil, and other spaces (radial bearing gaps and the like) are filled with the lubricating oil. In this manner, the fluid dynamic bearing device 101 as a finished product is obtained. Various oils can be used as the lubricating oil filling the inside of the fluid dynamic bearing device 101. Specifically, as the lubricating oil supplied to the fluid dynamic bearing device 101 for a disk drive such as an HDD, it is preferred to use ester-based lubricating oils excellent in low evaporation rate and low viscosity, such as dioctyl sebacate (DOS) and dioctyl azelate (DOZ) in consideration of temperature change during use and transportation.

In the fluid dynamic bearing device 101 configured as described above, when the shaft member 102 is rotated, the regions of the sintered metal bearing 108, in each of which the dynamic pressure generating grooves 108*a*1 and 108*a*2 are arranged, are opposed to the radial bearing surfaces 102*a*1 and 102*a*1 of the shaft portion 102*a* through an intermediation of radial bearing gaps. Then, in accordance with the rotation of the shaft member 102, in any of the upper and lower regions in each of which the dynamic pressure generating grooves 108*a*1 and 108*a*2 are arranged, the lubricating oil is pressed toward an axial center of the dynamic pressure generating grooves 108*a*1 and 108*a*2, and the pressure thereof is increased. Owing to the dynamic pressure action of the dynamic pressure generating grooves 108*a*1 and 108*a*2 as described above, the first radial bearing portion R11 and the second radial bearing portion R12 for rotatably supporting the shaft member 102 in the radial direction in a non-contact manner are formed so as to be formed at two positions while being separated from each other in the axial direction (refer to FIG. 8).

Further, in the thrust bearing gap between the region in which the dynamic pressure generating grooves 108*b*1 are arranged, the region being provided to the lower end surface 108*b* of the sintered metal bearing 108, and the upper end surface 102*b*1 of the flange portion 102*b* facing the region, and in the thrust bearing gap between the region in which the dynamic pressure generating grooves are arranged, the region being provided to the upper end surface 109*a* of the lid member 109, and the lower end surface 102*b*2 of the flange portion facing the region, oil films of the lubricating oil are respectively formed owing to the dynamic pressure action of the dynamic pressure generating grooves. Then, owing to the pressures of the oil films, the first thrust bearing portion T11 and the second thrust bearing portion T12 for supporting the shaft member 102 in the thrust direction in a non-contact manner are formed, respectively (refer to FIG. 8).

In this case, the sintered metal bearing 108 has a composition structure containing great many Fe-based compositions, and hence the inner peripheral surface 108a thereof to serve as the radial bearing surface has relatively high hardness. Thus, for example, immediately after rotation start or immediately before rotation stop of the shaft member 102 formed of SUS, even when contact sliding occurs between the outer peripheral surfaces 102a1 of the shaft portion 102a and the inner peripheral surface 108a of the sintered metal bearing 108 facing the outer peripheral surfaces 102a1, a hardness difference between both the surfaces 102a1 and 108a can be reduced, and hence abrasion between the sintered metal bearing 108 and the shaft portion 102a can be suppressed. In particular, as in this embodiment, under a state in which the hub 103 and the plurality of disks D are mounted to an upper portion of the shaft member 102, a center of gravity of a rotator including the shaft member 102 shifts to the upper side, and a moment load is high. Thus, the shaft member 102 and the sintered metal bearing 108 easily undergo contact sliding at the upper portion of the bearing. In this context, when the hardness difference between both the members 102a and 108 (hardness difference between both the sliding surfaces 102a1 and 108a) is reduced as described above, sliding abrasion caused by the contact can be suppressed as much as possible.

Further, the upper region provided to the inner peripheral surface 108a of the sintered metal bearing 108, in which the dynamic pressure generating grooves 108a1 and 108a2 are arranged, is formed asymmetrically in the axial direction with respect to the axial center of the band portion 108a3 thereof, and the axial dimension $X_{11}$ of the upper region with respect to the axial center is larger than the axial dimension $X_{12}$ of the lower region with respect thereto. Therefore, when the shaft member 102 is rotated, the drawing force (pumping force) for the lubricating oil is relatively larger in the upper region when compared to that in the lower region. Then, the lubricating oil flowing out downward from each of the radial bearing gaps owing to a difference of the drawing-in force circulates through the path constituted by the following in the following order: the thrust bearing gap of the first thrust bearing portion T11; the axial grooves 108d1 of the sintered metal bearing 108, which are positioned on a radially outer side of the thrust bearing gap; the axial gap between the upper end surface 108c and the lower end surface of the sealing member 110; the annular groove 108c1; and the radial grooves 108c2, so as to be re-drawn into the radial bearing gap of the first radial bearing portion R11.

As described above, with the structure which allows the lubricating oil to flow and circulate in the inner space of the bearing including the radial bearing gap, it is possible to prevent a phenomenon that the pressure of the lubricating oil in the inner space locally becomes negative and to solve the problems such as generation of air bubbles involved in generation of the negative pressure, leakage of the lubricating oil and deterioration in bearing performance due to the generation of air bubbles, and occurrence of vibration. Even when air bubbles are mixed in the lubricating oil for some reason, the air bubbles are discharged to the outside air from the oil surface (air liquid interface) of the lubricating oil in the seal space S when the air bubbles circulate in the above-mentioned circulation path with the lubricating oil, and hence the adverse effect due to the air bubbles is more effectively prevented.

Hereinabove, although description is made of one use example of the sintered metal bearing according to the second invention of the present application, the fluid dynamic bearing device 101 to which this bearing is applicable is not limited to this example.

Figure 11:
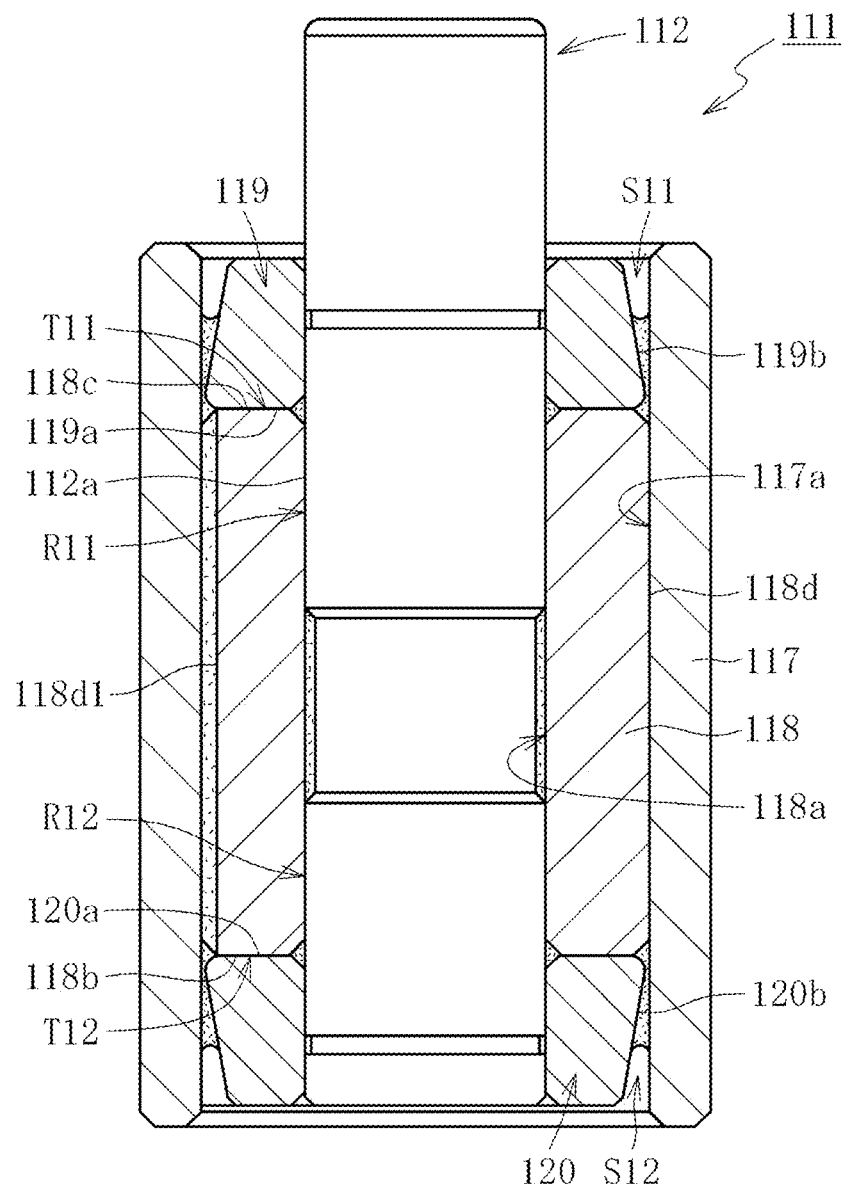
[FIG. 11] A sectional view of a fluid dynamic bearing device according to another embodiment.

For example, in the above-mentioned use example, description is made of a case where the fluid dynamic bearing device provided with the sintered metal bearing 108 has such a form that the thrust bearing portions T11 and T12 are formed respectively on both-end-surface-102b1-and-102b2 side of the flange portion 102b provided at one end of the shaft portion 102a. In this context, an axial clearance between those thrust bearing portions T11 and T12 may be changed. FIG. 11 illustrates an example of the changed clearance. A fluid dynamic bearing device 111 illustrated in FIG. 11 has a form different from the fluid dynamic bearing device 101 illustrated in FIG. 8 mainly in that two seal spaces S11 and S12 are arranged at both ends of a housing 117 and in that the thrust bearing portions T11 and T12 are formed at both ends of a sintered metal bearing 118.

In this illustration, the sintered metal bearing 118 according to the present invention has a lower end surface 118b provided with a dynamic-pressure-generating-groove arrangement region of the pattern illustrated in FIG. 10 (reverse in spiral direction with respect to that illustrated in FIG. 10) and an upper end surface 118c also provided with the dynamic-pressure-generating-groove arrangement region. Thus, the first thrust bearing portion T11 is provided between a lower end surface 119a of a first sealing member 119 and the upper end surface 118c of the sintered metal bearing 118, and the second thrust bearing portion 112 is provided between an upper end surface 120a of a second sealing member 120 and the lower end surface 118b of the sintered metal bearing 118. Further, the first seal space S11 is formed between an outer peripheral surface 119b of the first sealing member 119 fixed to a shaft member 112 and an inner peripheral surface 117a at an upper end of the housing 117, which faces the outer peripheral surface 119b, and the second seal space S12 is formed between an outer peripheral surface 120b of the second sealing member 120 and the inner peripheral surface 117a at a lower end of the housing 117, which faces the outer peripheral surface 120b. Note that, similarly to the case of the fluid dynamic bearing device 101 illustrated in FIG. 8, the radial bearing portions R11 and R12 are formed between an inner peripheral surface 118a provided with the radial dynamic pressure generating portions illustrated as an example in FIG. 9 and an outer peripheral surface 112a of the shaft member 112, which faces the inner peripheral surface 118a.

In the fluid dynamic bearing device 111 according to this embodiment, the clearance between both the thrust bearing portions T11 and T12 is large in comparison to those of the fluid dynamic bearing device 101 illustrated in FIG. 8, which enables, as a whole of the bearing, enhancement of a bearing capacity against the moment load. Thus, even when a rotary weight increases due to an increase in the number of disks in accordance with a capacity increase of information apparatuses such as an HDD, sliding abrasion caused by the contact of the sintered metal bearing 118 with respect to the shaft member 112 can be reduced (suppressed).

Figure 12:
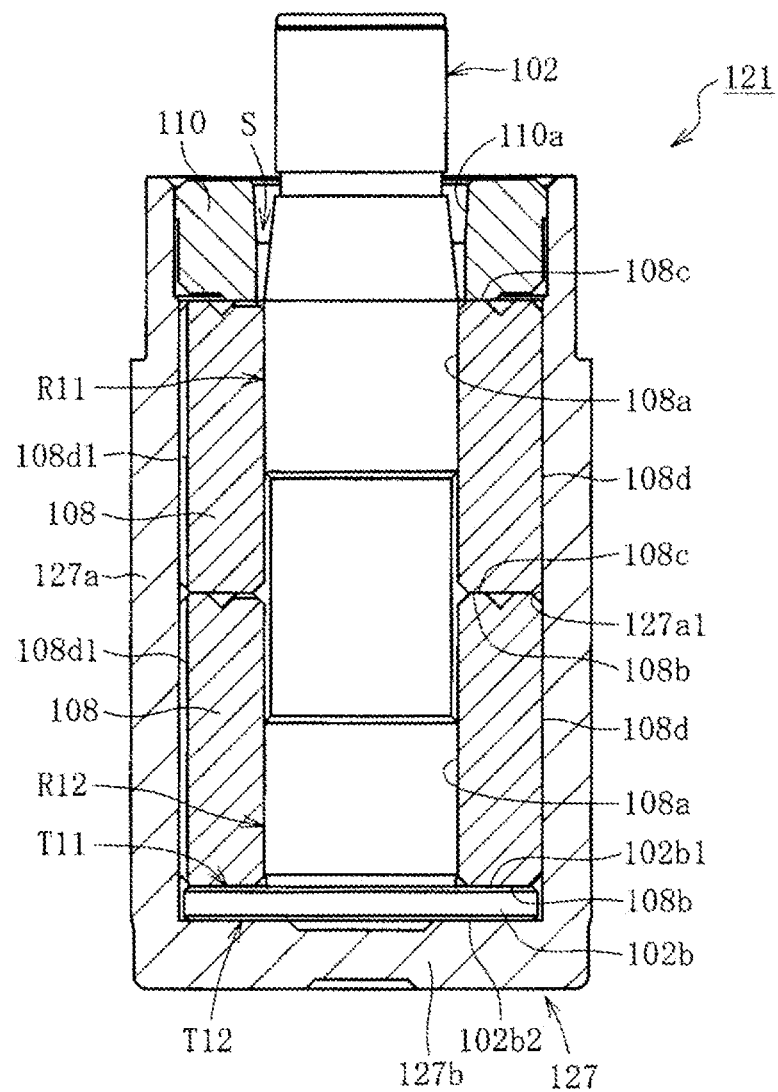
[FIG. 12] A sectional view of a fluid dynamic bearing device according to still another embodiment.

FIG. 12 is a sectional view of a fluid dynamic bearing device 121 according to still another embodiment. In the fluid dynamic bearing device 121 illustrated in FIG. 12, two sintered metal bearings 108 are superimposed on each other in the axial direction, and those sintered metal bearings 108 and 108 are fixed to an inner peripheral surface 127a1 of a bottomed-cylindrical housing 127 constituted by a cylindrical portion 127a and a bottom portion 127b. Of the two sintered metal bearings 108 superimposed on each other in the axial direction, the upper sintered metal bearing 108 is provided with the region in which the dynamic pressure generating grooves 108a1 and 108a2 are asymmetrically arranged, the region being illustrated as an example in FIG. 9 and provided only on the sealing-member-10 side. The lower sintered metal bearing 108 is provided with the region in which the dynamic pressure generating grooves 108a1 and 108a2 are symmetrically arranged, the region being illustrated as an example in FIG. 9 and provided only on a flange-portion-102b side. Thus, the radial bearing portions R11 and R12 are formed at farthest positions in the axial direction with respect to both the sintered metal bearings 108 and 108.

As described above, in the fluid dynamic bearing device 121 illustrated in FIG. 12, a clearance between the radial bearing portions R11 and R12 is large in comparison to those of the fluid dynamic bearing devices 101 and 111 illustrated in FIGS. 8 and 11, which contributes to, as a whole of the bearing, enhancement of the bearing capacity against the moment load. Thus, even when the rotary weight increases or a rotational speed becomes higher, sliding abrasion of the sintered metal bearings 108 and 108 can be reduced, and an excellent bearing performance can be yielded over a long period of time.

Further, in the above description, the structure is exemplified in which, as the radial bearing portions R11 and R12 and the thrust bearing portions T11 and T12, the dynamic pressure action of the lubricating oil is generated owing to the dynamic pressure generating grooves in a herringbone pattern or a spiral pattern. However, the structure to which the present invention is applicable is not limited thereto.

For example, as the radial bearing portions R11 and R12, while not shown, it is also possible to adopt a so-called stepped dynamic pressure generating portion in which axial grooves are formed at a plurality of points in the circumferential direction, or a so-called multi-arc bearing in which a plurality of arcuate surfaces are arranged in the circumferential direction so as to form, together with the outer peripheral surface 102a1 or 112a of the shaft member 102 or 112 opposed thereto, wedge-like radial gaps (bearing gaps) therebetween.

Alternatively, a so-called perfectly cylindrical bearing can be constituted by the inner peripheral surface 108a or 118a of the sintered metal bearing 108 or 118 as the radial bearing surface which is formed as a perfectly circular inner peripheral surface in which, as dynamic pressure generating portions, the dynamic pressure generating grooves, the arcuate surfaces, or the like are not provided, and by the perfectly circular outer peripheral surface opposed to the inner peripheral surface.

Further, while not shown as well, one or both the thrust bearing portions T11 and T12 can be constituted also by a so-called stepped bearing in which a plurality of dynamic pressure generating grooves having a radial groove shape are provided at predetermined intervals in the circumferential direction in a region constituting the thrust bearing surface, or by a corrugated bearing (in which the end surface thereof has a corrugated shape such as a harmonic waveform).

Further, in the above-mentioned embodiments, although description is made of a case where all of the dynamic pressure generating portions are provided on a fixation side (the housing 127, the sintered metal bearing 108, the lid member 109, and the like), apart or the entire of the dynamic pressure generating portions may be provided on a rotation side (the shaft member 102 or 112, the flange portion 102b, the sealing members 119 and 120, and the like). Specifically, the above-mentioned dynamic pressure generating portion can be provided to at least one of the following: the outer peripheral surface 102a1 or 112a of the shaft member 102 or 112; both the end surfaces 102b1 and 102b2 of the flange portion 102b; and the lower end surface 119a and the upper end surface 120a of the sealing members 119 and 120.

Further, in the above-mentioned embodiments, although description is made of a structure in which the shaft member 102 or 112 is rotated and supported by the sintered metal bearing 108 or 118, in contrast, the present invention is applicable also to a structure in which the sintered metal bearing 108 or 118 is rotated and supported by the shaft member 102 or 112. In this case, although not shown, the sintered metal bearing 108 or 118 is fixed by bonding to a member arranged on an outside thereof so as to be rotated integrally with the outside member and supported by the shaft portion on the fixation side.

Further, in the above-mentioned embodiments, the lubricating oil is exemplified as a fluid which is filled inside the fluid dynamic bearing device 101, 111, or 121 so as to form a film of the fluid in the radial bearing gaps and the thrust bearing gaps. Otherwise, it is also possible to use a fluid capable of forming a film of the fluid, for example, gas including air, a lubricant having fluidity, such as a magnetic fluid, or a lubricating grease. As a matter of course, the sintered metal bearings according to the present invention are excellent in abrasion resistance, and hence may be used as normal sliding bearings without use of a lubricating fluid at all.

EXAMPLE 2

For verification of advantageous effects of the second invention of the present application, an abrasion test, a radial-crushing test, and a permeated-oil-amount measurement test were each carried out on a sintered metal bearing (Example 2) formed of a raw-material powder containing an Fe-based powder and a Cu powder at predetermined rates, and a sintered metal bearing formed of a raw-material powder having a conventional composition (Comparison Example 3). Then, characteristics of the sintered metal bearings were evaluated relative to each other.

Here, the following were used as test materials: NC100.24 manufactured by Höganäs AB as the Fe powder; CE-15 manufactured by FUKUDA METAL FOIL & POWDER CO., LTD. as the Cu powder; and DAP410L manufactured by Daido Steel Co., Ltd. as the SUS powder. Further, in those experiments, an Sn powder and a graphite powder as low-melting-point-metal powders are used as raw-material powders; specifically, Sn-At-W350 manufactured by FUKUDA METAL FOIL & POWDER CO., LTD. was used as the Sn powder, and ECB-250 manufactured by Nippon Graphite Industries, ltd. was used as the graphite powder. A molding condition was set such that a density of a powder-press-molded body ranges from 6.5 to 6.9 (g/cm$^3$). A sintering temperature in Example 2 was set to 1,050° C., and a sintering temperature in Comparison Example 3 was set to 870° C. Compositions of the raw-material powders in Comparison Example 3 and Example 2 are listed in Table 3. The grain size distributions of the respective powders are listed in Tables 4 to 8.

TABLE 3

| | Formulation composition, wt % | | | |
|---|---|---|---|---|
| | Cu | Fe | Sn | C |
| Example 2 | 90 | 8 | 1 | 1 |
| Comparison Example 3 | 57.7 | 40 | 1.5 | 0.8 |

TABLE 4

Fe powder (NC100.24)

| Grain size | wt % |
|---|---|
| 45 μm or less | 16.6 |
| 45 to 75 μm | 24.3 |
| 75 to 106 μm | 31.1 |
| 106 to 150 μm | 27.2 |
| 150 μm or more | 0.8 |

TABLE 5

Cu powder (CE-15)

| Grain size | wt % |
|---|---|
| 45 μm or less | 64.4 |
| 45 to 63 μm | 27.1 |
| 63 to 75 μm | 6.7 |
| 75 μm or more | 1.8 |

TABLE 6

SUS powder (DAP410L)

| Grain size | wt % |
|---|---|
| 44 μm or less | 34.2 |
| 44 to 63 μm | 20.8 |
| 63 to 74 μm | 13.4 |
| 74 to 105 μm | 20.0 |
| 105 to 149 μm | 11.4 |
| 149 μm or more | 0.2 |

TABLE 7

Sn powder (Sn-At-W350)

| Grain size | wt % |
|---|---|
| 45 μm or less | 97.0 |
| 45 μm or more | 3.0 |

TABLE 8

Graphite (ECB-250)

| Grain size | wt % |
|---|---|
| 63 μm or less | 99.4 |
| 63 to 106 μm | 0.4 |
| 106 to 150 μm | 0.1 |
| 150 μm or more | 0.1 |

In both Example 2 and Comparison Example 3, in the abrasion test described below, a finished-product dimension of a test piece as a finished product was set as follows: φ (outer diameter) of 7.5 mm×t (axial width) of 10 mm. Further, in both Example 2 and Comparison Example 3, in the radial-crushing test and the measurement test of the permeated oil, the finished-product dimension was set as follows: φ (outer diameter) of 7.5 mm×φ(inner diameter) of 4 mm×t (axial width) of 10 mm. Still further, the number of the test pieces was set to five in both Example 2 and Comparison Example 3.

Here, the abrasion test was carried out under the following test conditions using above-mentioned test pieces.

Counterpart test piece:
Material: SUS420J2
Dimension: φ (outer diameter) 40 mm×t (axial width) 4 mm
Circumferential speed: 50 m/min
Surface pressure: 1.3 MPa
Lubricating oil: ester oil (viscosity: 12 mm$^2$/s)
Test time period: 3 hrs The measurement test of radial-crushing strength was carried out with use of the above-mentioned test pieces according to JIS Z 2507 in both Example 2 and Comparison Example 3.

The measurement test of the permeated oil was carried out as follows: supplying a lubricating oil from a tank to an inner periphery of a test piece (sintered metal bearing) that has not undergone impregnation of the lubricating oil; applying appropriate air pressure to the inner periphery of the test piece for a predetermined time period (at 4 atmospheres for 10 minutes); and measuring an amount of the lubricating oil having leaked from an outer peripheral surface of the test piece to an outside. Further, an ester-based oil (12 mm$^2$/s) was used as the lubricating oil.

Figure 16:
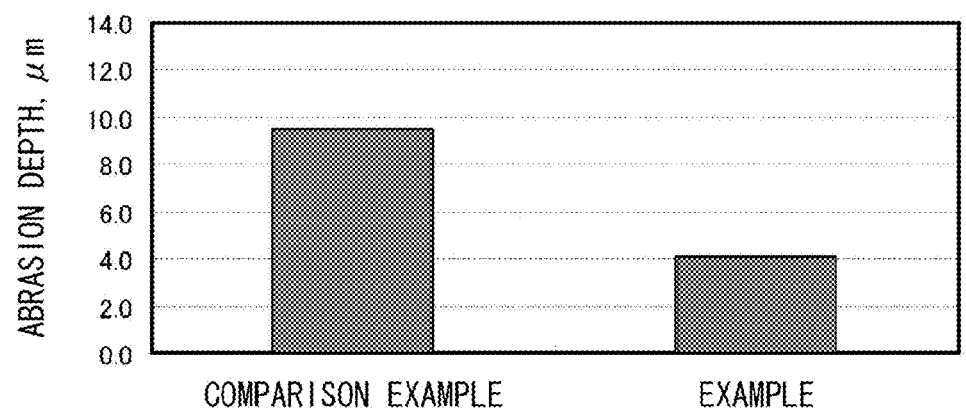
[FIG. 16] A graph showing measurement results of an abrasion test.
Figure 17:
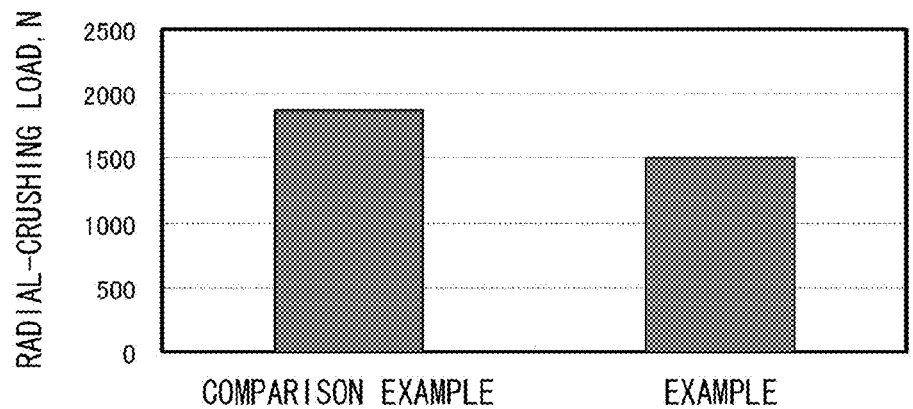
[FIG. 17] A graph showing measurement results of a radial-crushing test.
Figure 18:
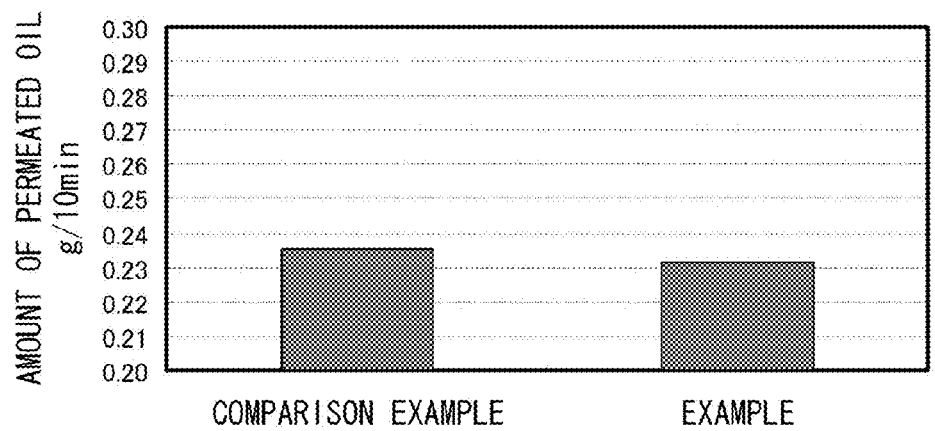
[FIG. 18] A graph showing results of measurement of an amount of permeated oil.

FIG. 16 shows measurement results of the abrasion test, FIG. 17 shows measurement results of the radial-crushing test, and FIG. 18 shows measurement results of the amount of the permeated oil. As shown in FIG. 16, when the rate of Fe-based compositions with respect to the entire composition is set to be ten times or more of that of Cu compositions by weight ratio (Example 2), such an effect as to decrease an abrasion amount was found to be markedly larger than that of a conventional composition (Comparison Example 3). Further, the results shown in FIG. 17 represent that, even in the case where the rate of the Fe-based compositions is markedly increased in comparison to that of the Cu compositions (Example 2), radial-crushing strength at a level equivalent to that of the conventional composition (Comparison Example 3) is exhibited. Further, the results shown in FIG. 18 represent that, in addition to excellence in abrasion resistance and radial-crushing strength as described above (Example 2), as also to the amount of the permeated oil (permeability of lubricating oil), the composition exerts performance at a level equivalent to that of the conventional composition (Comparison Example 3).

In the following, description is made of a manufacturing method for a bearing sleeve, and a fluid dynamic bearing device according to an embodiment of a third invention of the present application with reference to FIGS. 19 to 28.

Figure 19:
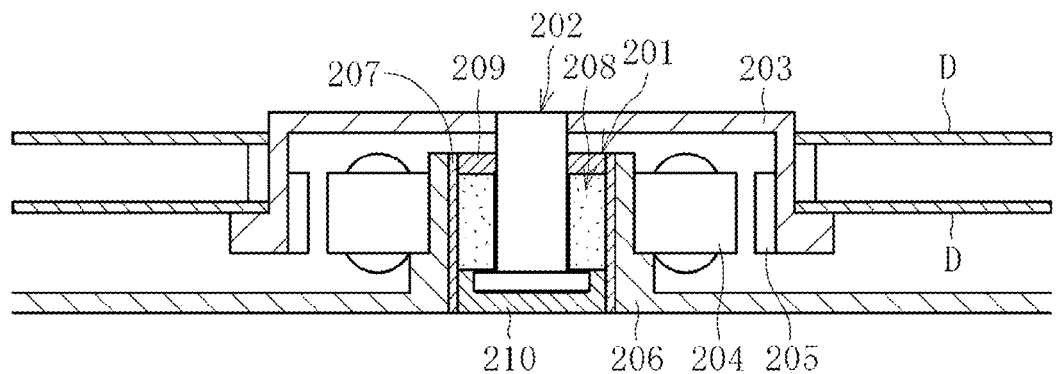
[FIG. 19] A sectional view of an information-apparatus spindle motor incorporating a fluid dynamic bearing device according to a third invention of the present application.

FIG. 19 conceptually illustrates one structural example of an information-apparatus spindle motor incorporating a fluid dynamic bearing device (dynamic pressure bearing device) 201 including a sleeve manufactured by the manufacturing method for a bearing sleeve according to the present invention. This spindle motor is used in a disk drive device, such as an HDD, and includes the fluid dynamic bearing device 201 supporting a shaft member 202 rotatably in a non-contact fashion, a disk hub 203 attached to the shaft member 202, and a stator coil 204 and a rotor magnet 205 that are opposed to each other through the intermediation of, for example, a radial gap. The stator coil 204 is attached to the outer periphery of a bracket 206, and the rotor magnet 205 is attached to the inner periphery of the disk hub 203. Further, the outer peripheral surface of a housing 207 of the fluid dynamic bearing device 201 is fixed to the inner peripheral surface of the bracket 206 by means of, for example, bonding or press-fitting. The disk hub 203 retains in its outer periphery one or a plurality of disc-like information storage media, such as magnetic disks (hereinafter, simply referred to as disks) D. In the spindle motor configured as described above, when the stator coil 204 is energized, the rotor magnet 205 is caused to rotate by an electromagnetic force generated between the stator coil 204 and the rotor magnet 205, and with this rotation, the disk hub 203 and the disks D retained by the disk hub 203 rotate integrally with the shaft member 202.

Figure 20:
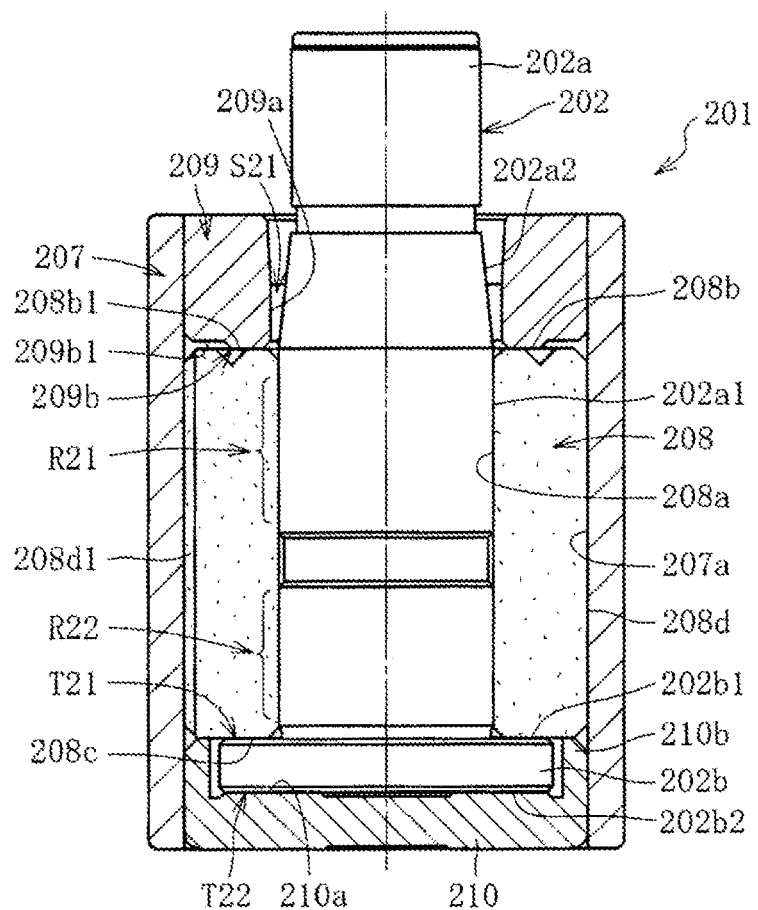
[FIG. 20] A vertical sectional view of the fluid dynamic bearing device.

FIG. 20 illustrates the fluid dynamic bearing device 201. The fluid dynamic bearing device 201 mainly includes the shaft member 202, the housing 207, a sleeve 208 and a thrust member 210 fixed to the housing 207, and a seal member 209. For the sake of convenience in illustration, a stationary side of the thrust member 210 of the housing 207 is referred to as the lower side and the side thereof opposite to the stationary side of the thrust member 210 is referred to as the upper side.

The shaft member 202 is formed, for example, of a metal material such as a stainless steel, or has a hybrid structure of a metal material and a resin material. The shaft member 202 includes a shaft portion 202a and a flange portion 202b provided integrally with or separately from a lower end of the shaft portion 202a. Note that, as the shaft member 202 having the hybrid structure, a shaft member can be used in which a core portion of the shaft portion 202a, the flange portion 202b, or both of the shaft portion 202a and the flange portion 202b are formed of a resin material.

The sleeve 208 is cylindrically formed of a porous body of a sintered metal, for example, a porous body of a sintered metal containing copper as a main component. Under a state in which the sleeve 208 is abut against an abutting portion 210b of the thrust member 210, the sleeve 208 is fixed by press-fitting to a predetermined position on an inner peripheral surface 207a of the housing 207. Note that, an outer diameter of the sleeve 208 is set to be larger than an inner diameter of the housing 207 by an amount of a predetermined press-fitting margin of an outer peripheral surface 208d described below of the sleeve 208 with respect to the inner peripheral surface 207a of the housing 207.

On the entire surface or in a partial cylindrical region of an inner peripheral surface 208a of the sleeve 208, there are formed dynamic pressure generating grooves as the radial dynamic pressure generating portion. As illustrated, for example, in FIG. 21A, in this embodiment, there are formed two regions, axially spaced apart from each other, in which a plurality of dynamic pressure generating grooves 208a1 and 208a2 are arranged in a herringbone pattern. In the upper region, in which the dynamic pressure generating grooves 208a1 are formed, the dynamic pressure generating grooves 208a1 are formed in axial asymmetry with respect to an axial center m (axial center of the region between the upper and lower oblique grooves), with an axial dimension $X_{21}$ of the region on the upper side of the axial center m being larger than an axial dimension $X_{22}$ of the region on the lower side of the axial center m.

One or a plurality of axial grooves 208d1 are formed in the outer peripheral surface 208d of the sleeve 208 over the entire axial length. In this embodiment, three axial grooves 208d1 are equiangularly formed.

Figure 21A:
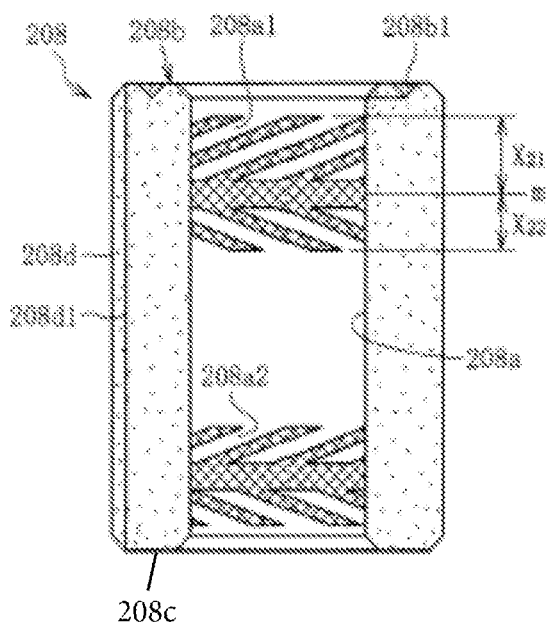
[FIG. 21 A] A vertical sectional view of a bearing sleeve.
Figure 21B:
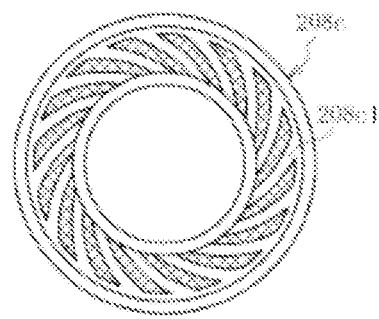

As illustrated, for example, in FIG. 21B, on the entire surface or in a partial annular region of a lower end surface 208c of the sleeve 208, as the thrust dynamic pressure generating portion, there is formed a region in which a plurality of dynamic pressure generating grooves 208c1 are arranged in a spiral pattern.

The sealing member 209 is formed, for example, of a resin material or an elastic metal material annularly, and arranged at an upper end of the inner peripheral surface 207a of the housing 207. An inner peripheral surface 209a of the sealing member 209 faces a tapered surface 202a2 provided on an outer periphery of the shaft portion 202a through intermediation of a predetermined seal space S21. Note that, the tapered surface 202a2 of the shaft portion 202a gradually decreases in diameter upward (outer portion side with respect to the housing 207), and functions as a capillary force seal and a centrifugal force seal at the time of rotation of the shaft member 202. Further, a lower end surface 209b of the sealing member 209 exhibits such a form that a radially outer region 209b1 thereof is retracted upward in the axial direction with respect to a radially inner region.

The thrust member 210 is formed, for example, of a resin material or a metal material, and arranged at a lower end of the inner peripheral surface 207a of the housing 207. In a partial annular region or on the entire surface of an end surface 210a of the thrust member 210, as the thrust dynamic pressure generating portion, there is formed a region in which a plurality of dynamic pressure generating grooves similar, for example, to the dynamic pressure generating grooves 208c1 illustrated in FIG. 21B are arranged in a spiral pattern (reverse in spiral direction). The region in which the dynamic pressure generating grooves are formed faces a lower end surface 202b2 of the flange portion 202b, and forms, at the time of rotation of the shaft member 202, a thrust bearing gap of a second thrust bearing portion T22 between the region in which the dynamic pressure generating grooves are formed and the lower end surface 202b2 (refer to FIG. 20). Further, in this embodiment, the thrust member 210 integrally includes the annular abutting portion 210b extending upward from an outer rim portion of the end surface 210a. An upper end surface of the abutting portion 210b is held in contact with the lower end surface 208c of the sleeve 208, and an inner peripheral surface of the abutting portion 210b faces an outer peripheral surface of the flange portion 202b through intermediation of a radial gap.

FIGS. 22 to 25 and 28 schematically illustrate a processing apparatus used for the sizing step for a sleeve at such a stage as to have undergone the sintering step after the powder-press molding (hereinafter, referred to as sintered raw material 211). This processing apparatus includes, as main components, a sizing pin 212 for molding a radially inner surface 211a of the sintered raw material 211 having a cylindrical shape, a die 213 for molding a radially outer surface 211b of the sintered raw material 211, a first punch (upper punch) 214 and a second punch (lower punch) 215 for holding both axial end surfaces of the sintered raw material 211 from an upper-and-lower direction (axial direction).

The upper punch 214 is externally inserted with respect to an outer periphery of the sizing pin 212 in such a manner as to be slidable with respect to the sizing pin 212 in the upper-and-lower direction. The sizing pin 212 and the upper punch 214 are moved up and down by respective independent power sources.

On an outer peripheral surface of the sizing pin 212, there are provided a projection-recess molding die in conformity with a shape of a bearing surface of the finished product. Projecting portions of the molding die form the regions of the dynamic pressure generating grooves in the bearing surface, and recessed portions forms regions other than the dynamic pressure generating grooves.

Figure 22:
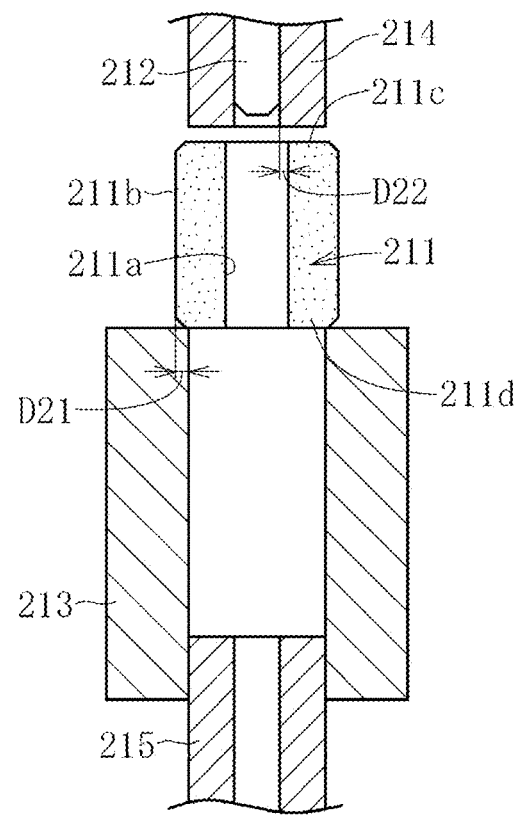
[FIG. 22] A conceptual view illustrating an example of a sizing step for a bearing sleeve according to a first embodiment of the third invention, the sizing step being performed in a manufacturing method for the bearing sleeve.

As illustrated in FIG. 22, under a state prior to press-fitting into the die 213, there exists a radially inner gap D22 between the radially inner surface 211a of the sintered raw material 211 and the radially outer surface of the sizing pin 212. A size of the radially inner gap D22 is, for example, 60 μm. A press-fitting margin D21 of the radially outer surface 211b of the sintered raw material 211 with respect to the die 213 is, for example, 200 μm.

Figure 24:
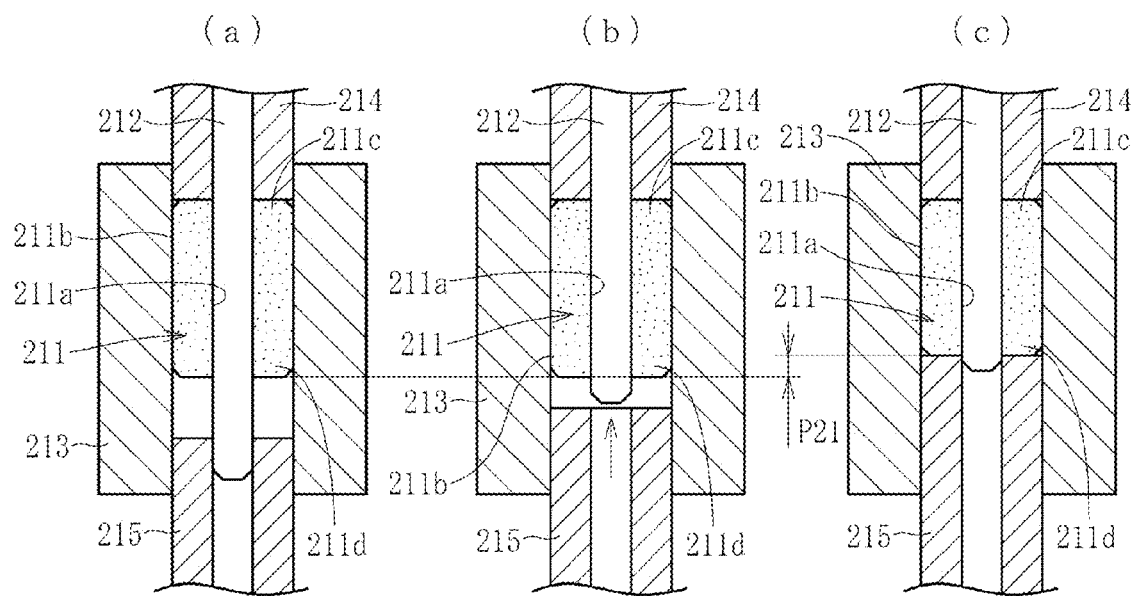
[FIG. 24] Still other conceptual views illustrating the example of the sizing step for the bearing sleeve according to the first embodiment of the third invention, the sizing step being performed in the manufacturing method for the bearing sleeve.
Figure 25:
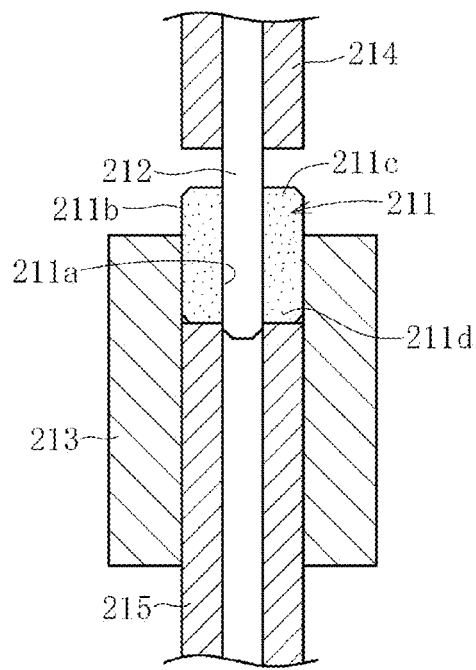
[FIG. 25] Yet another conceptual view illustrating the example of the sizing step for the bearing sleeve according to the first embodiment of the third invention, the sizing step being performed in the manufacturing method for the bearing sleeve.
Figure 26:
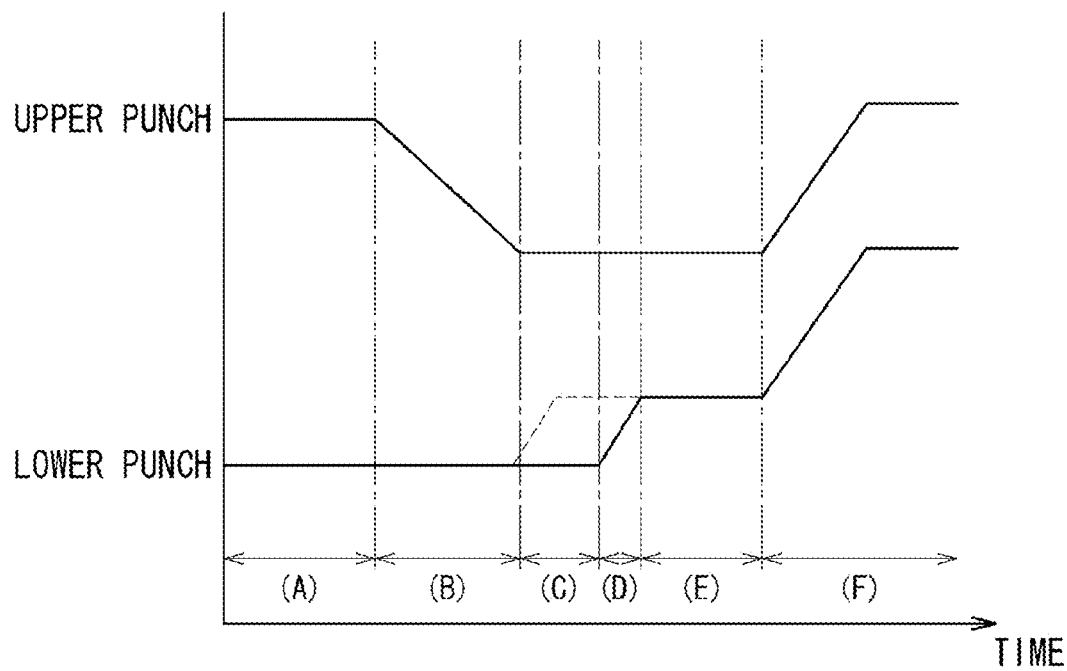
[FIG. 26] A chart showing a positional relation between upper and lower punches used in the manufacturing method for the bearing sleeve according to the first embodiment of the third invention.
Figure 27:
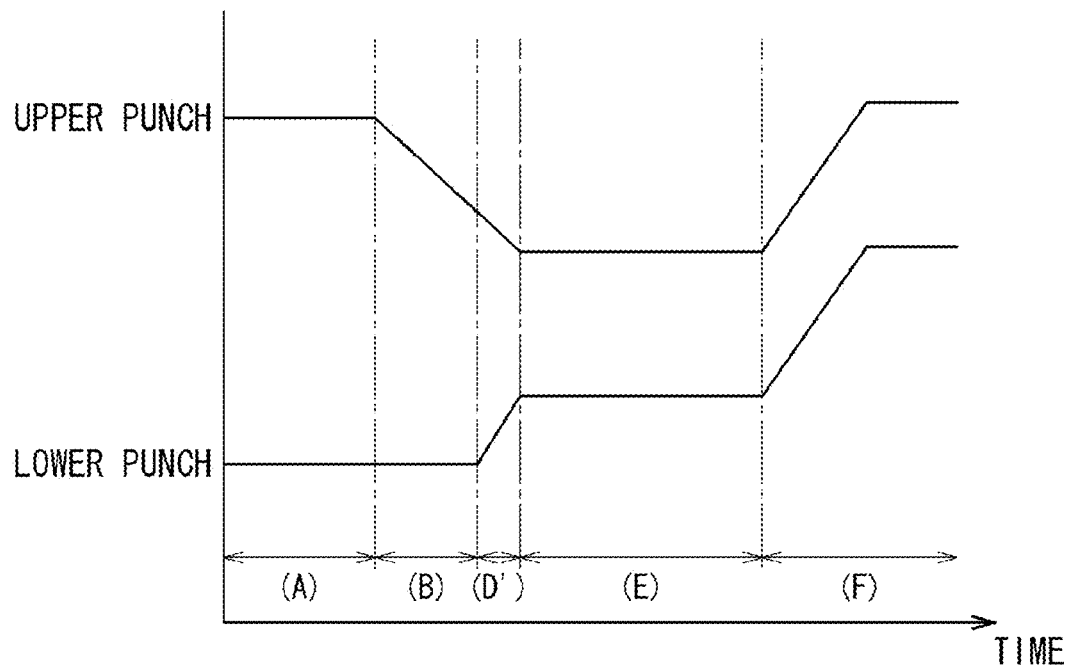
[FIG. 27] A chart showing a positional relation between upper and lower punches used in a manufacturing method for the bearing sleeve according to a second embodiment of the third invention.

Next, description is made of the manufacturing method for the fluid dynamic bearing device 201 according to a first embodiment of the third invention, in other words, a molding method for a sleeve with reference to FIGS. 22 to 26. FIG. 26 shows a situation of vertical movement of respective pressure surfaces of the upper punch 214 and the lower punch 215; specifically, the abscissa axis represents time, and the ordinate axis represents a vertical movement amount. A range (A) in FIG. 26 represents an initial state, in other words, the upper punch 214 and the lower punch 215 are in the state illustrated in FIG. 22. In the range (A), the sintered raw material 211 that has undergone the sintering step is arranged on an upper end surface of the die 213. The sizing pin 212 and the upper punch 214 are arranged above the sintered raw material 211 in the axial direction. In this illustration, the upper punch 214 is lowered together with the sizing pin 212 so that the upper punch 214 is applied to an upper end surface of the sintered raw material 211. The lower punch 215 stands by in the die 213.

Figure 23:
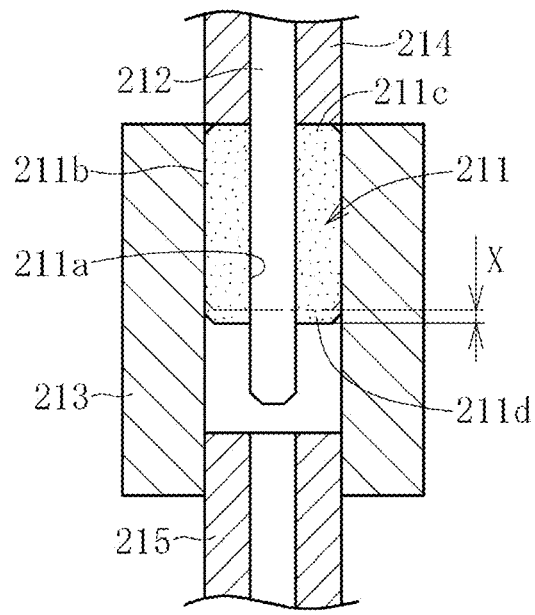
[FIG. 23] Another conceptual view illustrating the example of the sizing step for the bearing sleeve according to the first embodiment of the third invention, the sizing step being performed in the manufacturing method for the bearing sleeve.

As represented in a range (B) in FIG. 26, from the above-mentioned initial state, the upper punch 214 and the sizing pin 212 are lowered so that one end portion 211c of the sintered raw material 211 (part of the sintered raw material which is near the upper punch) is pressed with the upper punch 214 and that the sintered raw material 211 is press-fitted into the die 213. In this case, the sintered raw material 211 extends in the axial direction as illustrated in FIG. 23 by being press-fitted into the die 213. This extending amount is defined as X. Note that, an imaginary line in FIG. 23 indicates another end surface of the sintered raw material 211 prior to press-fitting into the die 213.

As represented in a range (C) in FIG. 26, the upper punch 214 is pushed-in up to a bottom dead center (refer to the status (a) of FIG. 24). Under a state in which the sintered raw material 211 is press-fitted into the die 213 over the entire length (upper punch 214 reaches the bottom dead center), as represented in a range (D) in FIG. 26, the lower punch 215 is pushed up in a direction of an arrow in the status (b) of FIG. 24. Then, as represented in a range (E) in FIG. 26, the sintered raw material 211 is pressurized from a lower-punch-215 side. In other words, another end portion 211d of the sintered raw material 211 is pressed onto an upper surface of the lower punch 215 so as to pressurize the sintered raw material 211 from the upper-and-lower direction. With this, as illustrated in the status (c) of FIG. 24, a moving amount of the lower punch 215 to an upper-punch side is represented by P21, and the another end portion 211d of the sintered raw material 211 is compressed by P21.

At this time, the sintered raw material 211 deforms by receiving a compressive force from the die 213, the upper punch 214, and the lower punch 215, and the radially inner surface 211a is pressurized in conformity with the molding die of the sizing pin 212. A pressurizing amount of the radially inner surface 211a is substantially equal to a difference of 70 μm (radial amount) between the press-fitting margin (radially outer interference) D21 (radial amount: 100 μm) and the radially inner gap D22 (radial amount: 30 μm). A surface layer part corresponding to a depth of 5 μm from the radially inner surface 211a is pressurized in conformity with the molding die of the sizing pin 212, and is plastically fluidized so as to adhere to the molding die. With this, the shapes of the molding die are transferred to the radially inner surface 211a of the sintered raw material 211, and the bearing surface is molded. At the time of molding, the radially outer surface 211b of the sintered raw material 211 is pressurized with the die 213, and both the end surfaces of the sintered raw material 211 are pressurized respectively with the upper punch 214 and the lower punch 215. A pressurizing amount of the radially outer surface corresponds to 200 μm, and pressurizing amounts of both the end surfaces each correspond approximately to 200 μm.

By the way, the moving amount P21 of the lower punch 215 to the upper-punch side is set to be larger than the axial extending amount X of the sintered raw material 211, the extension occurring at the time of press-fitting into the die with one of the punches. With this, the sintered raw material 211 is compressed to be smaller than an axial dimension of the sintered raw material 211 prior to extension in the axial direction (in other words, axial dimension of the sintered raw material 211 in the initial state).

After completion of the above-mentioned steps, as represented in a range (F) in FIG. 26, the upper punch 214 and the sizing pin 212 are raised integrally with each other, and the sintered raw material 211 is pressed from the lower punch 215 so as to be raised up to such a position that a lower end surface of the sintered raw material 211 is at the same height as that of the upper end surface of the die 213 (refer to FIG. 25). With this, a compressive force into an inner diameter direction of the sintered raw material 211 can be released so that the sintered raw material 211 is pulled out from the die 213. When the sintered raw material 211 is pulled out from the die 213, springback occurs in the sintered raw material 211, and an inner diameter dimension increases. With this, the sintered raw material can be pulled out from the sizing pin without damage to the shapes of the dynamic pressure generating portions.

As described above, in the present invention, the lower punch 215 is pushed up under the state in which the sintered raw material 211 is press-fitted in the die 213 over the entire length and the sintered raw material 211 is compressed. Thus, under the state in which the upper punch 214 reaches the bottom dead center, the sintered raw material 211 is pressurized from both the axial end portions thereof. Thus, the another end portion 211d of the sintered raw material 211 is also compressed by a pressing force imparted from the lower-punch side to the upper-punch side. With this, a difference in inner diameter dimension between both the axial end portions 211c and 211d of the sintered raw material 211 can be reduced.

The moving amount P21 of the lower punch 215 to the upper-punch side is set to be larger than the axial extending amount X of the sintered raw material 211, the extension occurring at the time of press-fitting into the die 213 with the upper punch 214. With this, the sintered raw material 211 is compressed to be smaller than the axial dimension of the sintered raw material 211 prior to extension in the axial direction. Thus, near the lower punch, the sintered raw material 211 can be reliably compressed.

Next, description is made of the manufacturing method for the fluid dynamic bearing device 201 according to a second embodiment of the third invention. In this case, the lower punch 215 is moved to the upper-punch side before the upper punch 214 reaches the bottom dead center. In other words, as represented in a range (B) in FIG. 27, from an initial state of a range (A) in FIG. 27, the upper punch 214 and the sizing pin 212 are lowered so that the one end portion 211c of the sintered raw material 211 (part of the sintered raw material which is near the upper punch) is pressed with the upper punch 214 and that the sintered raw material 211 is press-fitted into the die 213. Then, in a range (D') in FIG. 27, under a state in which the upper punch 214 has not yet reached the bottom dead center, the lower punch 215 is pushed up so as to pressurize the sintered raw material 211 from the lower-punch side. Subsequently, the sintered raw material 211 is pulled out from the die 213 by the method similar to that in the first embodiment.

As a third embodiment, the lower punch 215 maybe moved to the upper-punch side substantially at the same time when the upper punch 214 reaches the bottom dead center.

As a fourth embodiment, when the sintered raw material 211 is press-fitted into the die 213, the sintered raw material 211 can be press-fitted into the die 213 while being held with the upper punch 214 and the lower punch 215. In this case, as illustrated in the status (a) of FIG. 28, the sizing pin 212 and the upper punch 214 are arranged above the sintered raw material 211 in the axial direction, and the lower punch 215 stands by at an upper end of a molding hole of the die 213 so as to receive the lower surface of the sintered raw material 211. In this state, as illustrated in the status (b) of FIG. 28, the upper punch 214 and the sizing pin 212 are lowered so that the upper punch 214 is brought into contact with the one end portion 211c of the sintered raw material 211. As a result, the sintered raw material 211 is press-fitted into the die 213 under such a state as to be held with the upper and lower punches from both the sides in the axial direction. When the upper punch 214 is pushed-in up to the bottom dead center, the lower punch 215 is pushed up in a direction of an arrow in the status (c) of FIG. 28 so as to pressurize the sintered raw material 211 from the lower-punch side. In other words, the another end portion 211d of the sintered raw material 211 is pressed onto the upper surface of the lower punch 215 so as to pressurize the sintered raw material 211 from the upper-and-lower direction. In this case, as illustrated in the status (d) of FIG. 28, the moving amount of the lower punch 215 to the upper-punch side is represented by P21, and the another end portion 211d of the sintered raw material 211 is compressed by P21.

After completion of the above-mentioned steps, the upper punch 214 and the sizing pin 212 are raised integrally with each other, and the sintered raw material 211 is pressed from the lower punch 215 so as to be raised up to such a position that the lower end surface of the sintered raw material 211 is at the same height as that of the upper end surface of the die 213 (refer to FIG. 25). After that, the sintered raw material 211 is pulled out from the die 213 by the method similar to that in the above-mentioned first to third embodiments.

As a fifth embodiment, the sintered raw material 211 is press-fitted into the die 213 by the method similar to that in the above-mentioned fourth embodiment. Then, under the state in which the upper punch 214 has not yet reached the bottom dead center, the lower punch 215 is pushed up so as to pressurize the sintered raw material 211 from the lower-punch side.

As a sixth embodiment, the sintered raw material 211 may be press-fitted into the die 213 by the method similar to that in the above-mentioned fourth and fifth embodiments. Then, the lower punch 215 may be moved to the upper-punch side substantially at the same time when the upper punch 214 reaches the bottom dead center.

Figure 28:
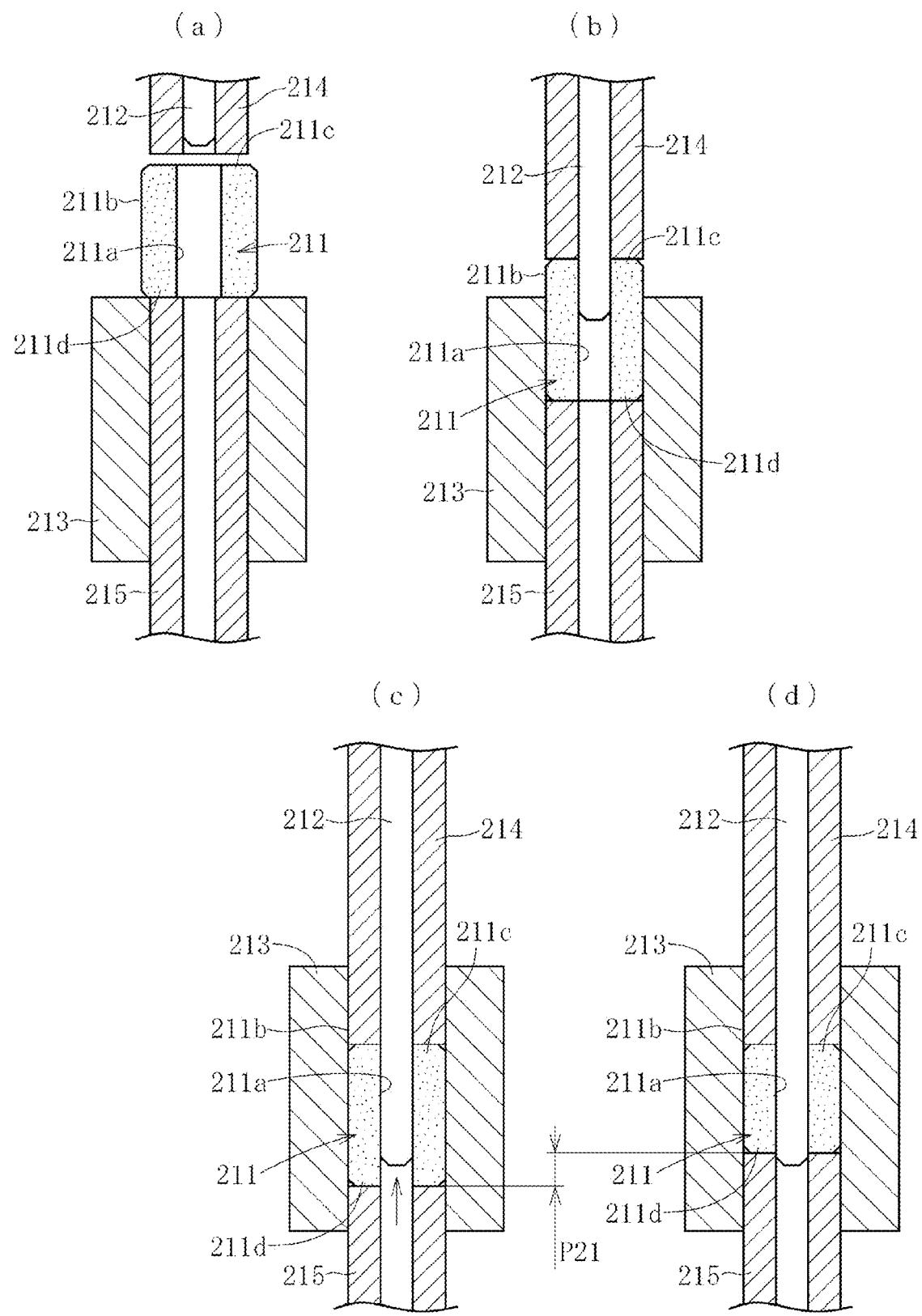
[FIG. 28] Conceptual views illustrating an example of a sizing step for bearing sleeves according to fourth and fifth embodiments of the third invention, the sizing step being performed in the manufacturing method for the fluid dynamic bearing device.
Figure 29:
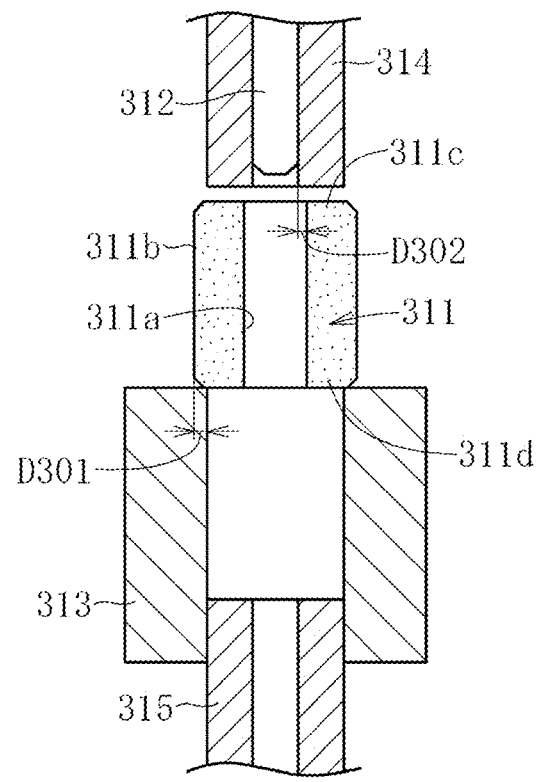
[FIG. 29] A conceptual view illustrating an example of a sizing step for a conventional bearing sleeve, the sizing step being performed in a manufacturing method for the conventional bearing sleeve.
Figure 30:
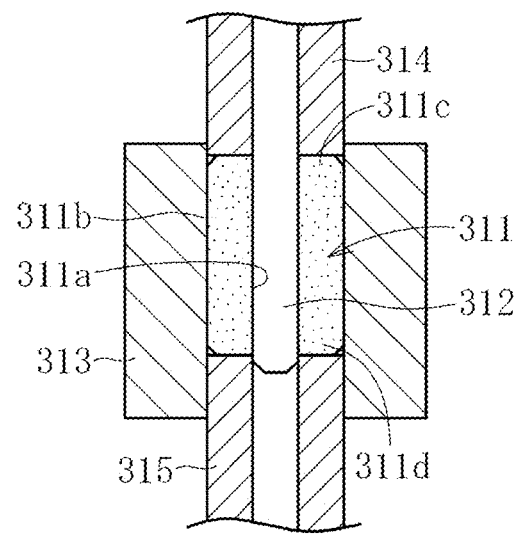
[FIG. 30] Another conceptual view illustrating the example of the sizing step for the conventional bearing sleeve, the sizing step being performed in the manufacturing method for the conventional bearing sleeve.
Figure 31:
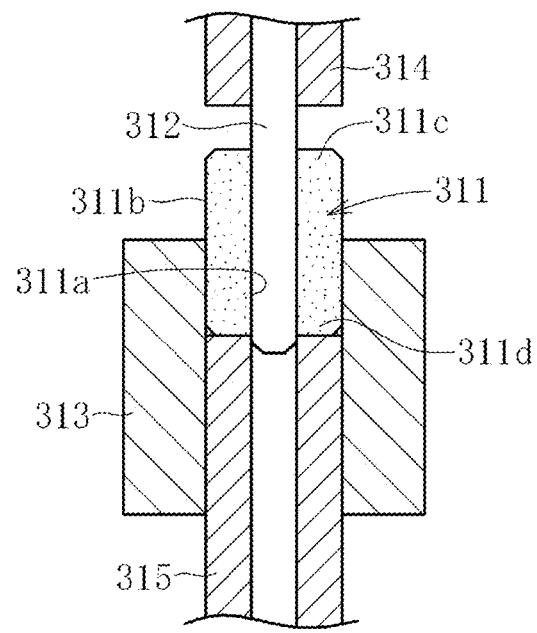
[FIG. 31] Yet another conceptual view illustrating the example of the sizing step for the conventional bearing sleeve, the sizing step being performed in the manufacturing method for the conventional bearing sleeve.
Figure 32:
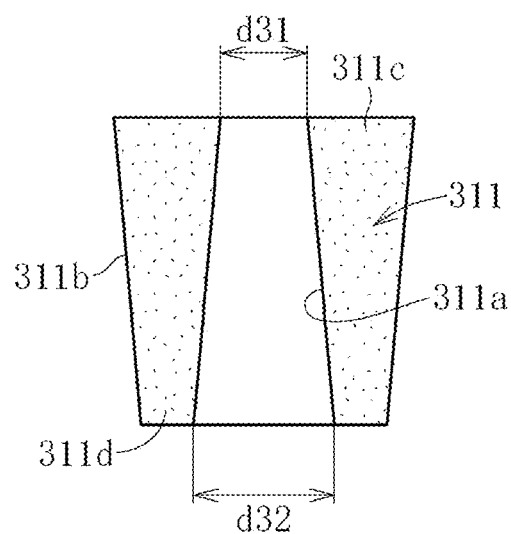
[FIG. 32] An enlarged sectional view of a sintered raw material manufactured by the manufacturing method for the conventional bearing sleeve.

Note that, in the manufacturing method for the bearing sleeve illustrated in FIG. 28, the components similar to those in the manufacturing method for the bearing sleeve illustrated in FIGS. 19 to 27 are denoted by the same reference symbols as those in FIGS. 19 to 27, and description thereof is omitted.

Hereinabove, description is made of the embodiments of the third invention. In this context, the present invention is not limited to the above-mentioned embodiments, and various modifications maybe made thereto. For example, the thrust dynamic pressure generating portion may be provided to the sintered raw material 211 to be formed as a sleeve. In this case, for example, a mold in conformity with a shape of the thrust dynamic pressure generating portion is provided in advance to the lower end surface of the upper punch 214 or the upper end surface of the lower punch 215. With this, when the sintered raw material 211 is held from both the sides in the axial direction, the thrust dynamic pressure generating portion can be formed simultaneously with sizing in the axial direction. Further, when the sintered raw material 211 is taken out after pressurization, it is unnecessary to raise the lower punch 215 and the upper punch 214 simultaneously with each other. Instead, the lower punch 215 may be raised after the upper punch 214 is raised.

Further, in the above-mentioned embodiments, description is made of a case where the region in which the plurality of dynamic pressure generating grooves 208a1 and 208a2 are arranged in a herringbone pattern is formed on the radially inner surface 208a of the sleeve 208. In this context, the present invention is applicable not only to the dynamic pressure generating portion of the above-mentioned structure but also to those of other structures.

REFERENCE SIGNS LIST 1, 11, 21 fluid dynamic bearing device
2, 12 shaft member
2a shaft portion
2a1, 12a outer peripheral surface
2b flange portion
2b1 upper end surface
2b2 lower end surface
3 hub
4 stator coil
5 rotor magnet
6 bracket
7, 17 housing
27 housing
7a, 17a, 27a1 inner peripheral surface
7b fixing surface
8, 18 sintered metal bearing
8a, 18a inner peripheral surface
8a1, 8a2 dynamic pressure generating groove
8a3 band portion
8b, 18b lower end surface
8b1 dynamic pressure generating groove
8c, 18 cupper end surface
8c1 annular groove
8c2 radial groove
8d, 18d outer peripheral surface
8d1, 18d1 axial groove
9 lid member
9a upper end surface
10, 19, 20 sealing member
10a sealing surface
19a lower end surface
19b, 20b outer peripheral surface
20a upper end surface
27a cylindrical portion
27b bottom portion
101, 111, 121 fluid dynamic bearing device 102, 112 shaft member
102a shaft portion
102a1, 112a 202a1 outer peripheral surface
102b flange portion
102b1, 202b1 upper end surface
102b2 lower end surface
103 hub
104 stator coil
105 rotor magnet
106 bracket
107, 117, 127 housing
107a, 117a inner peripheral surface
107b fixing surface
108, 118 sintered metal bearing
108a, 118a inner peripheral surface
108a1, 108a2 dynamic pressure generating grooves
108a3 band portion
108b, 118b lower end surface
108b1 dynamic pressure generating groove
108c, 118c 208b upper end surface
108c1, 208b1 annular groove
108c2 radial groove
108d 118d outer peripheral surface
108d1, 118d1 axial groove
109 lid member
109a upper end surface
110, 119, 120 sealing member
110a sealing surface
119a lower end surface
119b, 120b outer peripheral surface
120a upper end surface
127a cylindrical portion
127b bottom portion
201 fluid dynamic bearing device
202 shaft member
202a shaft portion
202a2 tapered surface
202b flange portion
202b2 lower end surface
203 disk hub
204 stator coil
205 rotor magnet
206 bracket
207 housing
207a inner peripheral surface
208 sleeve
208a inner peripheral surface
208a1 dynamic pressure generating groove
208c lower end surface
208c1 dynamic pressure generating groove
208d outer peripheral surface
208d1 axial groove
209 sealing member
209a inner peripheral surface
209b lower end surface
209b1 radially outer region
210 thrust member
210a end surface
210b abutting portion
211, 311 sintered raw material
211a, 311a radially inner surface
211b, 311b radially outer surface
211c, 311c one end portion
211d, 311 another end portion
212, 312 sizing pin
213, 313 die
214, 314 upper punch
215, 315 lower punch
P21 moving amount
R1, R2, R11, R12, R21, R22 radial bearing portion
T1, T2, T11, T12, T21, T22 thrust bearing portion
S, S1, S2, S11, S12, S21 seal space
d21, d22 inner diameter dimension
D21, D301 press-fitting margin
D22, D302 radially inner gap
X extending amount
X1, X2, X11, X12, X21, X22 axial dimension

The invention claimed is:

1. A sintered metal bearing, which is obtained by compression-molding and sintering subsequent thereto of a raw-material powder containing a plurality of metal powders, and which includes therein a large number of pores capable of impregnating oil,
wherein the raw-material powder contains a Cu powder, an SUS powder, and a pure Fe powder, and respective containing rates of the Cu powder, the SUS powder, and the pure Fe powder with respect to the raw-material powder are adjusted as follows:
the Cu powder: 15 wt % or more and 60 wt % or less;
the SUS powder: 10 wt % or more and 35 wt % or less; and
the pure Fe powder: 20 wt % or more and 60 wt % or less.

2. A sintered metal bearing according to claim 1, wherein the raw-material powder further contains an Fe-phosphide powder.

3. A sintered metal bearing according to claim 2, wherein respective containing rates of the Cu powder, the SUS powder, the pure Fe powder, and the Fe-phosphide powder with respect to the raw-material powder are adjusted as follows: the Cu powder: 15 wt % or more and 60wt % or less; the SUS powder: 10 wt % or more and 30 wt % or less; the pure Fe powder: 20 wt % or more and 60 wt % or less; and the Fe-phosphide powder: 0.1 wt % or more and 2.0 wt % or less.

4. A sintered metal bearing according to claim 1, wherein the raw-material powder further contains a low-melting-point-metal powder.

5. A sintered metal bearing according to claim 4, wherein the low-melting-point-metal powder comprises an Sn powder.

6. A sintered metal bearing according to claim 4, wherein respective containing rates of the Cu powder, the SUS powder, the pure Fe powder, and the low-melting-point-metal powder with respect to the raw-material powder are adjusted as follows: the Cu powder: 15 wt % or more and 45 wt% or less; the SUS powder: 10 wt % or more and 30 wt% or less; the pure Fe powder: 20 wt % or more and 60 wt % or less; and the low-melting-point-metal powder: 0.5 wt % or more and 10 wt % or less.

7. A sintered metal bearing according to claim 1, wherein the raw-material powder further contains graphite.

8. A sintered metal bearing according to claim 1, which is obtained by sintering at a temperature lower than a melting point of Cu.

9. A sintered metal bearing according to claim 1, wherein a sintering density is adjusted within a range of 6.8 g/cm$^3$ or more and 7.3 g/cm$^3$ or less.

10. A sintered metal bearing according to claim 1, comprising a dynamic pressure generating portion for generating a dynamic pressure action of a fluid between the dynamic pressure generating portion and a shaft to be rotationally supported.

11. A fluid dynamic bearing device comprising the sintered metal bearing according to claim 1.

* * * * *